(12) United States Patent
Lee

(10) Patent No.: US 10,895,038 B2
(45) Date of Patent: Jan. 19, 2021

(54) HIGH CONSISTENCY RE-PULPING METHOD, APPARATUS AND ABSORBENT PRODUCTS INCORPORATING RECYCLED FIBER

(71) Applicant: GPCP IP Holdings LLC, Atlanta, GA (US)

(72) Inventor: Jeffrey A. Lee, Neenah, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 165 days.

(21) Appl. No.: 15/990,596

(22) Filed: May 26, 2018

(65) Prior Publication Data

US 2018/0347111 A1 Dec. 6, 2018

Related U.S. Application Data

(60) Provisional application No. 62/512,800, filed on May 31, 2017.

(51) Int. Cl.
*D21C 5/02* (2006.01)
*D21C 7/00* (2006.01)
(Continued)

(52) U.S. Cl.
CPC ............... *D21C 5/02* (2013.01); *D21C 5/025* (2013.01); *D21C 7/00* (2013.01); *D21C 7/06* (2013.01); *D21C 9/1005* (2013.01); *D21H 11/14* (2013.01)

(58) Field of Classification Search
CPC . D21B 1/325; D21B 1/08; D21B 1/32; D21C 5/02; D21C 5/025; D21C 7/00; D21C 7/06; D21C 9/1005; D21H 11/14
See application file for complete search history.

(56) References Cited

U.S. PATENT DOCUMENTS 3,994,771 A 11/1976 Morgan, Jr. et al.
4,102,737 A 7/1978 Morton
(Continued)

FOREIGN PATENT DOCUMENTS

SU 456067 A1 * 1/1975
WO 1995012550 A1 5/1995
(Continued)

OTHER PUBLICATIONS

International Preliminary Report on Patentability in corresponding PCT patent application dated Aug. 22, 2019.
(Continued)

*Primary Examiner* — Jose A Fortuna
(74) *Attorney, Agent, or Firm* — Laura L. Bozek

(57) ABSTRACT

A method of pulping wastepaper includes providing a pulping vessel with a rotor and at least one flow sensor adapted to measure slurry flow within the pulping vessel. The pulping vessel is charged with wastepaper and water to form a slurry, the amounts of wastepaper and water being present such that the slurry has consistency in the range of from 10% to 30%. The wastepaper charge in the pulping vessel is pulped at a pre-selected power level while monitoring poloidal slurry flow in the pulping vessel; and from time-to-time, water may be added to the pulping vessel when the poloidal flow falls below a predetermined lower threshold flow value in order to reduce viscosity and thereby restore poloidal flow within the pulping vessel. Doppler velocimetry is a preferred method of monitoring pulp flow. In a particularly preferred construction the rotor has a variable power drive. The inventive method is especially useful for making high quality, high brightness furnishes from wastepaper which varies from batch to batch.

20 Claims, 18 Drawing Sheets

(51) Int. Cl.
*D21C 7/06* (2006.01)
*D21C 9/10* (2006.01)
*D21H 11/14* (2006.01)

(56) References Cited

U.S. PATENT DOCUMENTS

| | | | |
|---|---|---|---|
| 4,415,408 A * | 11/1983 | Greey | B01F 15/00207 |
| | | | 162/198 |
| 4,529,480 A | 7/1985 | Trokhan | |
| 4,535,943 A | 8/1985 | Couture et al. | |
| 4,593,861 A | 6/1986 | Blakley et al. | |
| 4,668,339 A * | 5/1987 | Terry | D21B 1/08 |
| | | | 162/13 |
| 4,804,439 A | 2/1989 | Fredriksson | |
| 4,865,690 A | 9/1989 | Bernard et al. | |
| 5,234,545 A | 8/1993 | Fabry et al. | |
| 5,520,783 A | 5/1996 | White et al. | |
| 5,538,594 A | 7/1996 | Hank et al. | |
| 5,785,809 A | 7/1998 | Ow et al. | |
| 5,958,179 A | 9/1999 | Gehr et al. | |
| 6,132,556 A | 10/2000 | Stromberg et al. | |
| 6,651,679 B2 | 11/2003 | Danger et al. | |
| 6,988,682 B2 | 1/2006 | Hautala | |
| 7,013,287 B1 | 3/2006 | Doelle et al. | |
| 7,318,880 B2 * | 1/2008 | Kankaanpaa | D21B 1/32 |
| | | | 162/198 |
| 7,585,388 B2 | 9/2009 | Yeh et al. | |
| 7,585,389 B2 | 9/2009 | Yeh et al. | |
| 7,662,257 B2 | 2/2010 | Edwards et al. | |
| 7,850,823 B2 | 12/2010 | Chou et al. | |
| 7,951,266 B2 | 5/2011 | Kokko et al. | |
| 8,215,574 B2 * | 7/2012 | Wiljan | D21B 1/345 |
| | | | 241/30 |
| 8,778,138 B2 | 7/2014 | Super et al. | |
| 2010/0147479 A1 * | 6/2010 | Goto | D21B 1/325 |
| | | | 162/252 |
| 2015/0147814 A1 * | 5/2015 | Joensuu | G01N 15/0255 |
| | | | 436/2 |
| 2017/0183816 A1 * | 6/2017 | Terai | D21B 1/325 |
| 2018/0347111 A1 * | 12/2018 | Lee | D21H 11/14 |

FOREIGN PATENT DOCUMENTS

| | | |
|---|---|---|
| WO | 2016049032 A1 | 3/2016 |
| WO | 2016201414 A1 | 12/2016 |

OTHER PUBLICATIONS

Hong, Y. et al, "Repulping Characteristics of Wastepaper at High Consistency with Helical Repulper", Research Progress in Pulping and Papermaking [International Symposium on Emerging Technologies of Pulping and Papermaking], 3rd, Guangzhou, China, Nov. 8-10, 2006, pp. 854-858, South China University of Technology Press, Guangzhou.

International Search Report and Written Opinion dated Jul. 24, 2018.

* cited by examiner

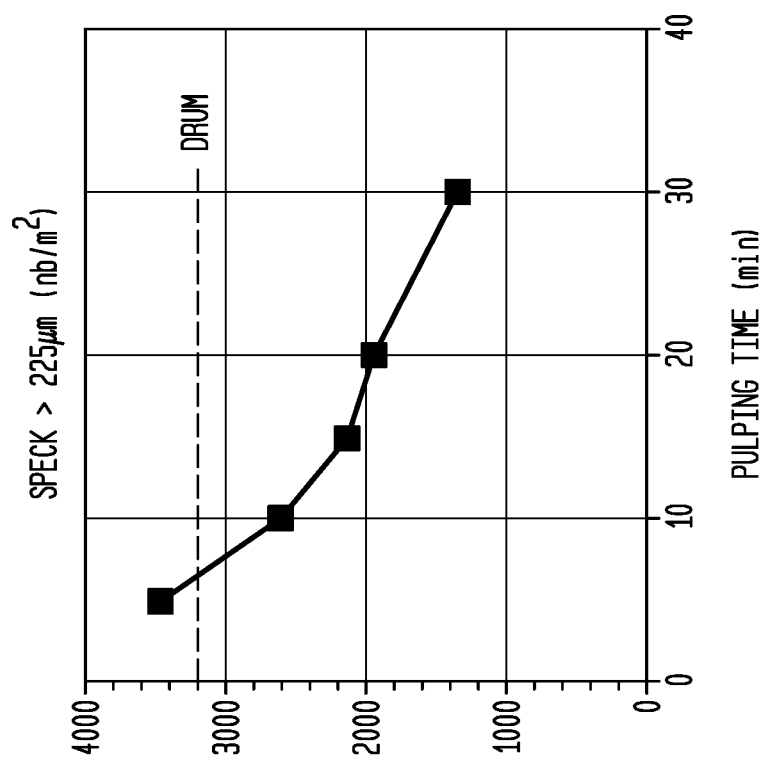
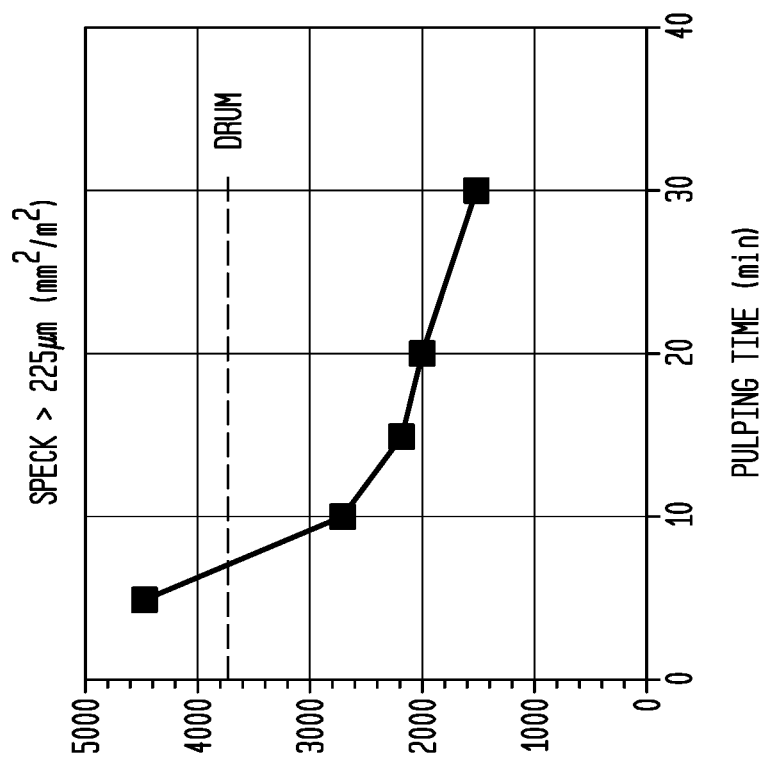

DATA SET 7

DATA SET 8

VELOCITY

VELOCITY AND WT%

DATA SET 7

HIGH CONSISTENCY RE-PULPING METHOD, APPARATUS AND ABSORBENT PRODUCTS INCORPORATING RECYCLED FIBER

CLAIM FOR PRIORITY

This application is based on U.S. Provisional Application No. 62/512,800, filed May 31, 2017 of the same title, the priority of which is hereby claimed and the disclosure of which is incorporated herein by reference.

TECHNICAL FIELD

The present invention relates to wastepaper recycling for paper manufacture utilizing high consistency pulpers and absorbent products incorporating recovered fiber.

BACKGROUND

Wastepaper pulping is the first step in producing a recycle papermaking furnish. The main measurements of the effectiveness of pulping are: 1) yield, 2) Effective Residual Ink Concentration (ERIC)—an optical test which measures the presence of fine ink particles at 950 nm in a standard handsheet or filter pad of fiber, 3) handsheet brightness, 4) stickies content, 5) ash content, 6) ink ("dirt") specks or particles, and 7) Visual Speck Index (VSI). VSI uses a dilute sample of pulp which is visually compared to a standard reference to measure the percentage of the sample that is pulped (absence of fiber flakes).

While virgin fiber tends to be of higher quality than recycle fiber, it costs more than recycle fiber and many environmentally conscious consumers actually prefer absorbent products such as paper towel and paper tissue made with recycled fiber.

Wastepaper recycling typically includes, in addition to re-pulping, de-inking and bleaching the wastepaper. U.S. Pat. No. 5,785,809, entitled "Biological De-Inking Method" discloses de-inking wastepaper with enzymes. U.S. Pat. No. 5,234,545, entitled "Process for Regenerating Wastepaper in the Presence of Hydroxysulfonate Salts" provides typical conditions for wastepaper recycling in Col. 4, lines 24-42. U.S. Pat. No. 4,865,690, entitled "Process and Plant for Recycling Waste Printed Papers" teaches a recycling process for wastepaper including re-pulping, de-inking and bleaching. Wastepaper recycling places demands on the equipment, especially because a pulp slurry flow is abrasive over time and because of the presence of foreign objects such as glass, wood or metal fragments, plastics and other trash in the recycle stream. U.S. Pat. No. 7,013,287, entitled "Stock Preparation Monitoring System and Method of Same" discloses ultrasonic sensing of damage or wear to screens, augers, foils, rolls and so forth in a paper stock processing system.

A variety of re-pulping methods are commercially practiced, the three dominant technologies are 1) drum continuous pulping, 2) low to mid consistency pulping (batch and continuous), and 3) high consistency batch pulping. The trend in the industry has been towards low energy drum pulping and reduced energy batch pulping systems. The trend is largely based on the conventional wisdom that the pulping technology utilized is not a critical factor in the ultimate pulp quality because modern deinking systems have the capability to compensate for any deficiencies in pulping. Contrary to conventional wisdom, it has been found in accordance with the present invention that high consistency pulping of wastepaper is preferred, provided that the pulping process is adequately controlled to avoid over-pulping the wastepaper.

High consistency wastepaper re-pulping is described in Hong, Y. et al, "Repulping Characteristics of Wastepaper at High Consistency with Helical Repulper", from Research Polymers in Pulping and Papermaking [International Symposium on Emerging Technologies of Pulping and Papermaking], $3^{rd}$, Guangzhou, China, Nov. 8-10, 2006, pp. 854-859 which discusses re-pulping of wastepaper in a laboratory size high consistency pulper.

The following references also relate to high consistency pulping. U.S. Pat. No. 6,988,682, entitled "Method and System for Utilizing Waste" discloses recycling with a continuous operation high consistency pulper. See Abstract. U.S. Pat. No. 6,651,679, entitled "Process for the Breaking and Cleaning of Contaminant-Containing Raw Paper Stocks, in Particular of Recovered Paper" teaches a recycling process which may include a high consistency pulper. See Col. 3, lines 44-49. U.S. Pat. No. 5,958,179, entitled "Process for Increasing Pulp Whiteness by Bleaching Printed Wastepaper Under Intense Dispersing Mechanical Treatment" relates to high consistency recycling of wastepaper as does U.S. Pat. No. 5,538,594, entitled "Method for Producing a Blade Coated Paper from Recycled, High Lignin Content, Waste Paper". U.S. Pat. No. 5,520,783, entitled "Apparatus for Bleaching High Consistency Pulp With Ozone" discloses high consistency bleaching of pulp with ozone. See also U.S. Pat. No. 4,593,861, entitled "Apparatus for Pulping Paper Making Stock at High Consistencies".

U.S. Pat. No. 4,535,943, entitled "Pulping Apparatus Including a Rotor and Helical Screw Flights Extending Upwardly From the Rotor" discloses a batch pulper. Note FIG. 1 of the '943 patent. This reference discloses pulping at consistencies of 12% to 25% solids followed by adding water near the end of processing to flush the re-pulping vessel. See Col. 6, lines 34-46.

Conventional practice in connection with high consistency pulping is to run a recipe and a timed sequence of operations, typically including a fixed amount of wastepaper, a fixed amount of water and a predetermined pulping interval. Conventional high consistency pulping can lead to results which are highly variable in terms of brightness (with the presence of under-pulped fiber flakes also sometimes being a significant problem) reducing yield and quality. It is believed that brightness variability is somewhat inherent to wastepaper differences from batch-to-batch and that no method exists to predict the optimal pulper recipe prior to actual pulping. The viscosity of a wastepaper slurry is impacted by many factors including the feed wastepaper moisture level, ash and coating levels, and the types and morphology of the papermaking fibers utilized to manufacture the original paper products. It should also be noted that the cycle time for high consistency pulping is very short, as low as 8-12 minutes at full rotor power, so that any adjustments, if any, must be done very quickly. While it might be possible to test each bale of wastepaper for processing characteristics, such testing would be cost and time prohibitive.

High consistency pulping has advantages over other methods in terms of capital costs, yield, ink removal, breakdown of flakes, fiber throughputs, ease of operation, wastewater volume and operating expense. However, it is seen that high consistency pulping as conventionally practiced often has an adverse effect on the brightness of the finished pulp because there are relatively high levels of residual ink in the product which persist throughout further processing. Without intending to be bound by any particular theory, it is believed that high energy pulping taken to very low flake levels results in irrecoverable brightness loss because the fine inks reattach to the fibers from frictional forces. These inks are not easily removed in deinking systems. The key to preferred processing in accordance with the invention is to reliably apply the correct amount of energy to achieve the optimal point where you get a high yield, good ink breakup (low dirt), high throughput and no loss in brightness.

SUMMARY OF INVENTION

There is provided in one aspect of the invention a method of pulping wastepaper comprising: (a) providing a pulping vessel with a rotor having a power drive and at least one flow sensor adapted to measure slurry flow within the pulping vessel; (b) charging the pulping vessel with wastepaper and water to form a wastepaper slurry, the amounts of wastepaper and water being present such that the slurry has consistency in the range of from 10% to 30%; (c) pulping the wastepaper slurry in the pulping vessel while monitoring poloidal slurry flow in the pulping vessel; and (d) maintaining poloidal slurry flow in the pulper at or above a lower threshold slurry flow value during pulping.

It has been discovered that the pulping method employed in wastepaper recycling has a persistent impact on the finished stock quality regardless of the deinking system. The present invention provides a method to produce high value pulps from wastepaper by way of a unique control strategy for high consistency pulping. The method most preferably involves directly controlling the rate of energy input and the total specific energy used in pulping through a variable power rotor and through maintaining a target poloidal velocity in the repulping vessel. Velocity control of the pulp slurry is conveniently achieved by monitoring the poloidal velocity of the material in the pulper while adjusting viscosity of the charge by adding water from time to time as necessary in order to maintain poloidal flow in the pulper above a lower flow threshold. Poloidal velocity in the pulper is most preferably monitored with Doppler velocimetry. Without intending to be bound by any theory, it is believed that the inventive method avoids "over-pulping" wherein ink is smeared or reattached to the fiber being processed. Overpulping is a function of both pulping time and power application. Consider what happens in the pulper during the high consistency processing cycle. At the beginning, the pulper only contains the water charge. As the wastepaper is added there is a very fluid mixture of water and fairly intact wastepaper and wastepaper flakes. This mixture has a viscosity close to water and circulates fairly rapidly. The shape of the mass is an elongated toroid and the flow is both toroidal (circular around the major axis) and poloidal (circular around the minor axis i.e. flow from the bottom of the tub, up the wall of the vessel, back towards the center and down through the rotor, see arrow 34, FIG. 1). Poloidal flow is thus conveniently characterized by upward velocity of the slurry near the wall of the pulper in most cases. A directional Doppler effect ultrasonic flow meter is most preferred. These devices measure pulp slurry velocity in the direction indicated on the meter and should be positioned on the pulper in areas of low turbulence, such as away from the base of the rotor for best results. As the individual fibers are liberated the viscosity of the pulp mixture increases and the flow slows down. The increased viscosity also increases the power draw of the motor. As pulping continues the ash and coatings in the fiber are liberated and broken up further increasing the viscosity. After a few minutes the toroidal flow essentially stops and most of the flow is poloidal. The power application reaches its maximum and the rotor to fiber and fiber to fiber forces continue to break up the inks and fiber flakes. At the end of the cycle dilution water is added and the pulp mass viscosity drops and both toroidal and poloidal flows of relatively high velocity are seen.

In many of the wastepaper pulping cycles observed while developing the invention, discussed hereinafter, it is believed the viscosity increased to the point where significant poloidal flow also stopped during a pulping cycle. The pulp mass near the walls of the pulper and at the top of the pulper stop circulating and only the pulp in the vicinity of the rotor was moving. The consequences of the drop in flow include: 1) much of the pulp is under-pulped as it only circulates for the first part of the pulping cycle, and 2) the pulp at the bottom and near the rotor is over-pulped causing ink smearing and excessive comminution of dirt particles making them difficult to separate in a de-inking system and adversely impacting brightness of the finished pulp.

The present invention provides a method and apparatus to practice high consistency pulping while avoiding overpulping of the wastepaper charge. A salient feature of the invention is to maintain poloidal flow in the pulper above a lower threshold as is seen in FIG. 2, for Data Set 5. FIG. 2 shows a steadily increasing energy application with sufficient flow in all regions of the pulper throughout the re-pulping cycle.

The most preferred results are achieved through selection and control of pulping time, power application and the viscosity of the charge to the high consistency pulper; these latter two features being related for a given system as is noted below.

The power draw of the pulper motor is a complicated function of variables including the type of motor, the speed of the motor, the gear ratio of the gear box connecting the motor to the rotor, the rotor design, the pulper tub design, the amount of water in the pulper, the amount of wastepaper in the pulper, the characteristics of the wastepaper and how broken up or individualized the wastepaper is at a given time in the cycle. For a given system design and set of the above variables the energy application to the wastepaper is directly proportional to the viscosity of the pulp mass and the speed of the rotor up to the point of excessive rotor slip or cavitation. At ideal conditions there is a smooth flow of pulp into the top of the rotor at the center of the pulper. The rotor accelerates the pulp as it travels downward and outward and the pulp is flung out from the bottom of the rotor with sufficient force to cause a poloidal flow across the bottom, up the sides and back to the top center of the pulper where it reenters the rotor. As the rotor speed is increased the resistance to flow increases and the load on the rotor will increase.

As the rotor speed is increased the torroid shape of the pulp mass also begins to elongate in the direction of its vertical axis as the upward force along the pulper wall starts to become larger than the constant gravitational force which pulls the pulp downward and inward towards the top of the rotor. As rotor speed increases, at some point the rotor becomes starved as the inflow of pulp to the center of the pulping vessel can no longer keep up with the outflow along the bottom of the pulping vessel to the vessel wall and the rotor power drops. The pulp also begins to short circuit the pulper wall so that the pulp nearer the bottom will continuously circulate through the rotor while the pulp higher will stagnate and eventually stop circulating.

The second critical factor in operating the high consistency pulper is the viscosity of the pulp mass. At the initial addition of wastepaper to the water in the pulper the viscosity of the fluid is essentially that of water. As the mass of paper begins to breakdown into smaller pieces and individual fibers the viscosity increases substantially. The wastepaper can also include additives such as clay, starch, calcium carbonate, titanium dioxide and others. These additives are released from the paper and increase the viscosity. As the fillers and individual fibers increase the viscosity the resistance to flow increases and the critical rotor speed is reduced where starving and cavitation occurs. Once the rotor starts to cavitate and the pulper short circuit the result is some fraction of the fiber is over pulped (the shortcircuiting fiber) and some is under pulped (the upper mass of fiber that stops moving). Depending on the situation the average energy application may be unchanged so that monitoring the power alone may not detect short circuiting of the pulp flow.

A preferred method of pulping is to pulp at maximum rotor power for the shortest possible time so that the pulping occurs very quickly and the brightness loss is minimized. This requires the viscosity be very high and maintained just below the level where pulp slurry flow drops below the minimum value required to fully load the pulper rotor. The invention method provides a way to operate the pulper in this narrow window by controlling the specific power application and the linear velocity in the pulper utilizing a variable power (and speed) rotor and using dilution water addition to adjust viscosity in response to pulp slurry flow measurements. Operating the pulper motor near its practical maximum is preferred, generally at greater than 90% of the maximum power of the motor, preferably at greater than 95% of the maximum power of the motor, such as between 95% and 100% of the maximum power of the motor. A preferred system for powering the pulper rotor is an AC motor provided with an AC drive. AC drives change the speed of an AC motor by changing voltage and frequency of the power supplied to the motor. Typically the AC drive consists of rectifier and inverter units and a microprocessor to control output. In order to maintain proper power factor and reduce excessive heating of the motor, the name plate volts/hertz ratio should be maintained.

Further features and advantages will become apparent from the discussion which follows.

BRIEF DESCRIPTION OF DRAWINGS

The invention is described in detail below with reference to the drawings wherein:

FIGS. 3A and 3B are plots of contamination versus pulping time for wastepaper;

DETAILED DESCRIPTION

Figure 1:
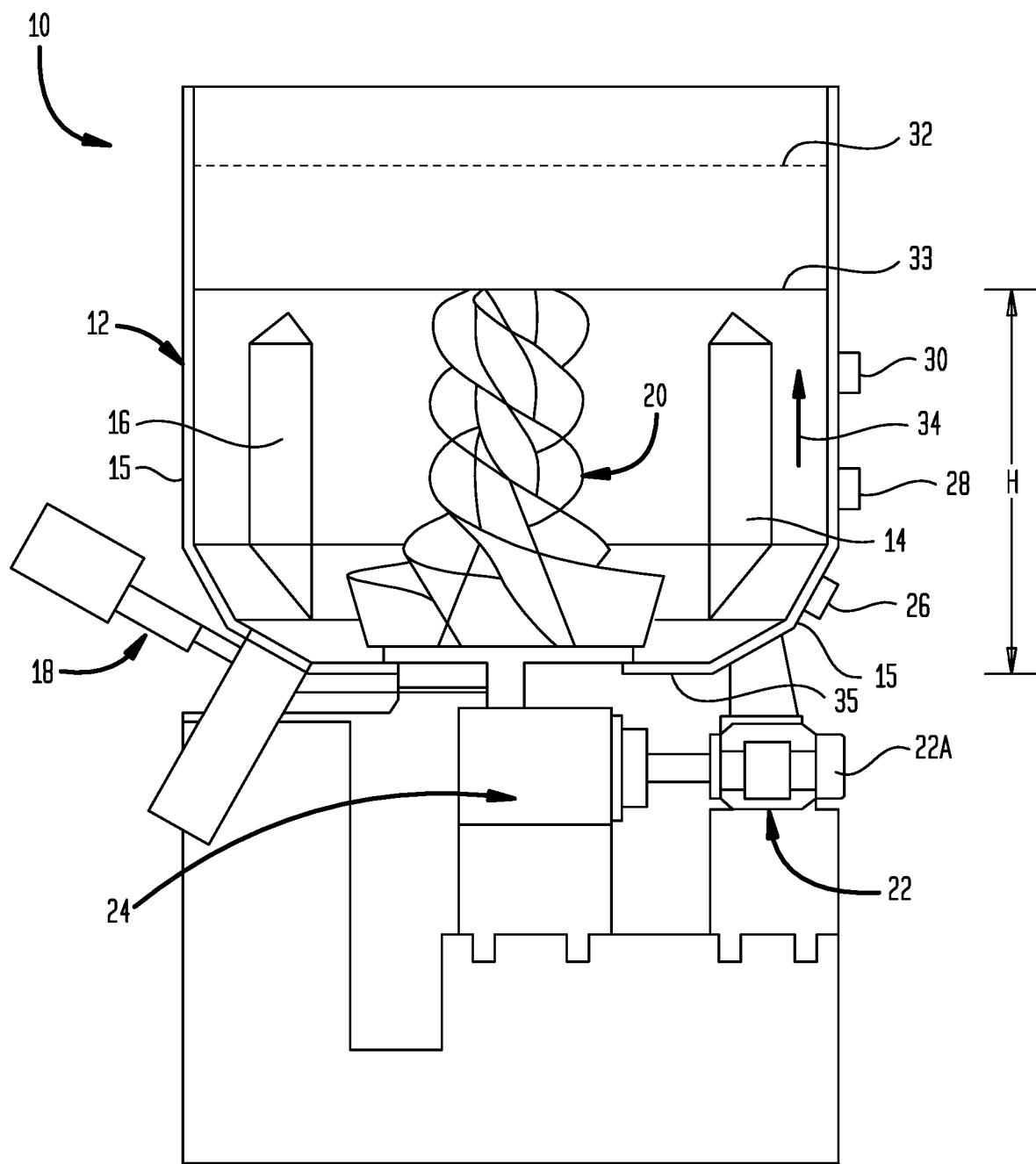
FIG. 1 is a schematic diagram of an apparatus for re-pulping wastepaper in accordance with the present invention.

The invention is described in detail below in connection with the Figures for purposes of illustration only. The invention is defined in the appended claims. Terminology used herein is given its ordinary meaning consistent with the exemplary definitions set forth immediately below; g refers to grams, $m^2$ refers to square meters, MT means metric ton, kW refers to kilowatt, percents, ppm and like terminology relates to weight percent, parts per million by weight unless otherwise indicated and so forth.

"Consisting essentially of" and like terminology refers to the recited components and excludes other ingredients which would substantially change the basic and novel characteristics of the composition, article or process. Unless otherwise indicated or readily apparent, a composition or article consists essentially of the recited or listed components when the composition or article includes 90% or more by weight of the recited or listed components. That is, the terminology excludes more than 10% unrecited components.

The term "cellulosic", "cellulosic sheet" and the like are meant to include any product incorporating papermaking fiber having cellulose as a major constituent. "Papermaking fibers" include virgin pulps or recycle (secondary) cellulosic fibers or fiber mixes comprising cellulosic fibers. Fibers suitable for making the webs of this invention include: nonwood fibers, such as cotton fibers or cotton derivatives, abaca, kenaf, sabai grass, flax, esparto grass, straw, jute hemp, bagasse, milkweed floss fibers, and pineapple leaf fibers; and wood fibers such as those obtained from deciduous and coniferous trees, including softwood fibers, such as northern and southern softwood Kraft fibers; hardwood fibers, such as eucalyptus, maple, birch, aspen, or the like. Papermaking fibers used in connection with the invention are typically naturally occurring pulp-derived fibers (as opposed to reconstituted fibers such as lyocell or rayon) which are liberated from their source material by any one of a number of pulping processes familiar to one experienced in the art including sulfate, sulfite, polysulfide, soda pulping, etc. Papermaking fibers may comprise a blend of conventional fibers (whether derived from virgin pulp or recycle sources) and high coarseness lignin-rich tubular fibers, such as bleached chemical thermomechanical pulp (BCTMP). Pulp-derived fibers thus also include high yield fibers such as BCTMP as well as thermomechanical pulp (TMP), chemithermomechanical pulp (CTMP) and alkaline peroxide mechanical pulp (APMP). "Furnishes" and like terminology refers to aqueous compositions including papermaking fibers, optionally wet strength resins, debonders and the like for making paper products.

Kraft softwood fiber is low yield fiber made by the well known Kraft (sulfate) pulping process from coniferous material and includes northern and southern softwood Kraft fiber, Douglas fir Kraft fiber and so forth. Kraft softwood fibers generally have a lignin content of less than 5 percent by weight, a length weighted average fiber length of greater than 2 mm, as well as an arithmetic average fiber length of greater than 0.6 mm.

Kraft hardwood fiber is made by the Kraft process from hardwood sources, i.e., eucalyptus and also has generally a lignin content of less than 5 percent by weight. Kraft hardwood fibers are shorter than softwood fibers, typically having a length weighted average fiber length of less than 1 mm and an arithmetic average length of less than 0.5 mm or less than 0.4 mm.

Consistency refers to percent solids of a nascent web or slurry, for example, calculated on a dry basis. A slurry having 80 percent water and 20 percent dry wastepaper has a consistency of 20 percent.

"Air dry" or simply "dry" means including residual moisture, by convention up to about 10 percent moisture for pulp and up to about 6 percent for paper; while oven dry refers to pulp or paper which is dried in an oven for several hours and is significantly drier.

Products produced in accordance with the invention are made with a cellulosic fiber basesheet and have an absorbency or SAT value as well as tensiles and densities suitable for tissue and towel products. Typical SAT values are greater than about 3 g/g in most cases. See U.S. Pat. No. 8,778,138.

"CWP" refers to a process for making absorbent products by way of a conventional wet-press process; that is, wet-pressing a furnish to a drying cylinder with a papermaking felt followed by creping the web from the cylinder. See U.S. Pat. No. 7,951,266, FIG. 7 thereof.

A "Structured Basesheet Process" refers to a process for making an absorbent product by wet creping (fabric creping) from a cylinder prior to final drying. See U.S. Pat. Nos. 7,850,823; 7,585,388; 7,585,389; and 7,662,257.

A "TAD Process" refers to through-air dried processes for making absorbent products. Throughdried, creped products are disclosed in the following patents: U.S. Pat. No. 3,994,771 to Morgan, Jr. et al.; U.S. Pat. No. 4,102,737 to Morton; and U.S. Pat. No. 4,529,480 to Trokhan. The processes described in these patents comprise, very generally, forming a web on a foraminous support, thermally pre-drying the web, applying the web to a Yankee dryer with a nip defined, in part, by an impression fabric, and creping the product from the Yankee dryer.

A towel product is typically characterized by having predominantly (more than 50% by weight based on fiber content) softwood fiber.

A tissue product is typically characterized by having predominantly (more than 50% by weight based on fiber content) hardwood fiber.

"Wastepaper" is any paper including papermaking fibers that may be re-pulped and recycled. Wastepaper thus includes mill broke, pre-consumer waste, and post-consumer waste including office wastepaper. Mill broke is paper trimmings and other paper scrap from the manufacture of paper, and is recycled internally in a paper mill. Pre-consumer waste is material which left the paper mill but was discarded before it was ready for consumer use. Post-consumer waste is material discarded after consumer use, such as old corrugated containers, old magazines, and newspapers, while office wastepaper is a subcategory of post-consumer waste which includes predominantly laser and xerographic printed paper. Paper suitable for recycling is sometimes referred to simply as "scrap paper".

Recycled fiber is fiber recovered from wastepaper. While any suitable recycle fiber may be used in producing absorbent products of the invention, recycle fiber with relatively low levels of ground wood is preferred in many cases, for example recycle fiber with less than 15% by weight lignin content, or less than 10% by weight lignin content may be preferred depending on the furnish mixture employed and the application. Recycle fiber is in many cases 80% hardwood fiber.

A variable power rotor refers to a rotor coupled to a drive motor which has controls for setting the power level, typically as a percent of a maximum value for the motor. The rotor operates at variable speed to load the motor to the set power value, and the speed will vary depending upon the viscosity of the charge being pulped. Such equipment is commercially available, such as, for Example a Siemens SINAMICS GM150 variable speed drive (Siemens Aktiengesellschaft, Munich, Bavaria). Preferred variable power rotors are coupled to an AC motor provided with an AC drive.

Pulp Flow, Poloidal Flow Instability, Pulping Duration and Operating Target Levels Any suitable non-invasive method for measuring poloidal velocity of the pulp slurry within the pulper may be employed. Non-invasive flow measurement techniques based on ultrasonic methods are preferred, although techniques based on radar, Doppler radar, a 3D CAT scan or other penetrating radiation meter and the like may likewise be employed. Any method that can measure the flow without being exposed to the moving pulp mass is suitable. There are two types of ultrasonic flow measurement techniques, transit time and Doppler; the latter technology also being sometimes referred to as Doppler velocimetry. Given the motion of the pulp beneath the surface cannot be measured by observation, or by real time rotor power data, a particularly effective option is to utilize a Doppler effect ultrasonic flow meter. This technique requires hardly any modification to a batch pulper other than attaching a Doppler velocimetry meter to the tub wall. It should be noted the interior of the pulper is an extremely hostile environment for a flow measuring device. The pulp mass generates high levels of friction and the wastepaper often contains solid metal, glass and wood contaminants which damage any type of probe installed inside the pulper tub. A clear viewing port could be added to the wall of the pulper in order to use an optical method; however the port would likely be quickly damaged. Initial testing was completed using a portable Doppler meter (Cole-Parmer Model 32986-00) and it was found that Doppler velocimetry worked surprisingly well. An advantage of this method is that it is directional which allows both the speed and direction of flow to be measured in the flow direction indicated on the meter. Suitable meters for mounting on a batch pulper tub wall include Dynasonics 5XPN1 (Badger Meter, Milwaukee, Wis.), Dwyer Instruments 3PCL1 (Dwyer Instruments, Michigan City, Ind.) and equivalents from other manufacturers.

Poloidal slurry flow exhibits instability when the poloidal velocity exhibits a sharp drop over a relatively short time interval, typically followed by additional abrupt changes in poloidal velocity after the onset of instability of the poloidal slurry flow. The onset of instability is the point at which an initial sharp drop in poloidal velocity is observed. A sharp drop in poloidal velocity is typically characterized by a poloidal velocity decrease of 25% or more over a period of 0.3 minutes or so, a deceleration of 25%/0.3 minutes or 83.3%/minute. Onset of instability in poloidal slurry flow is thus typically characterized by a deceleration in poloidal velocity of more than 80% per minute, as compared to poloidal velocity just prior to onset of instability. Decelerations of more than 100% per minute, 150% per minute or larger are commonly observed at the onset of instability, as compared with the poloidal velocity just prior to the onset as is seen particularly in FIGS. 14-19, discussed hereinafter. In practical operation, it may be desirable to avoid pulp slurry flow instability altogether and/or discontinue pulping shortly after pulp flow instability occurs.

A particular level or range of poloidal velocity (or other parameter) is deemed maintained during a pulping operation when that level or range of poloidal velocity (or other parameter) is preserved over a substantial portion of a pulping time interval, more than 40% of pulping duration. Pulping duration and like terminology such as a pulping time interval is the residence time of the wastepaper in the pulper under pulping conditions. For batch pulping described herein, the time interval for pulping starts when the pulper is charged and the motor is set to pulping speed and continues until the post-pulping dilution water is added. Post-pulping dilution water is typically provided in amounts which significantly lower charge consistency; more than 5%, i.e., from 20% consistency to less than 15% consistency. Post-pulping addition water addition is accompanied by a sharp increase in poloidal slurry flow as is seen in FIGS. 14-18. A particular level of a parameter, for example, poloidal velocity or range is preferably maintained or preserved over at least 50% of the pulping time interval or pulping duration; suitably, the particular level or range of poloidal velocity is maintained over at least 60%, 70%, 75%, 80%, 85% or more up to 90% or 95% or up to 100% of the pulping time interval. "During pulping" means within or during the pulping time interval.

Target level(s) and operating level(s) refer to a particular target value or a range within a particular parameter is maintained. For example, the target level for poloidal flow may be a particular velocity such as 0.15 ft/sec or a range of from 0.1 ft/sec to 0.4 ft/sec.

When referring to a range, "within" includes the endpoints of the range.

Preliminary Trials

Samples of wastepaper were supplied to a pilot plant and a series of experiments run with pulping technology as a variable. Drum pulping was directly compared to high consistency pulping with both pulps run through the same pilot scale deinking and bleaching process. The deinking and bleaching process was chosen to simulate state of the art commercially available technology FIGS. 3A and 3B show the impact of pulping technology on visible ink speck concentration and count. On FIG. 3B nb/m$^2$ refers to the number of specks per square meter. FIGS. 3A and 3B clearly show the superior ink breakup of the high consistency technology over drum pulping. It also shows the ink breakup with time in the high consistency unit (drum pulping run 30 minutes with only a 30 minute sample tested) and the initial high rate of ink breakup in the initial 10 to 15 minutes of pulping.

Figure 4B:
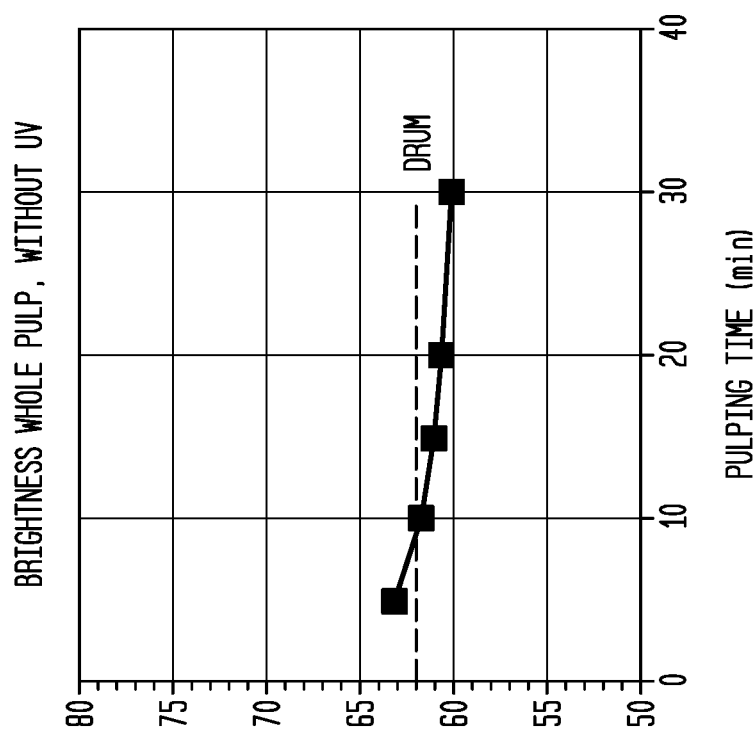
FIGS. 4A and 4B are plots of residual ink and handsheet brightness versus pulping time for wastepaper.
Figure 4A:
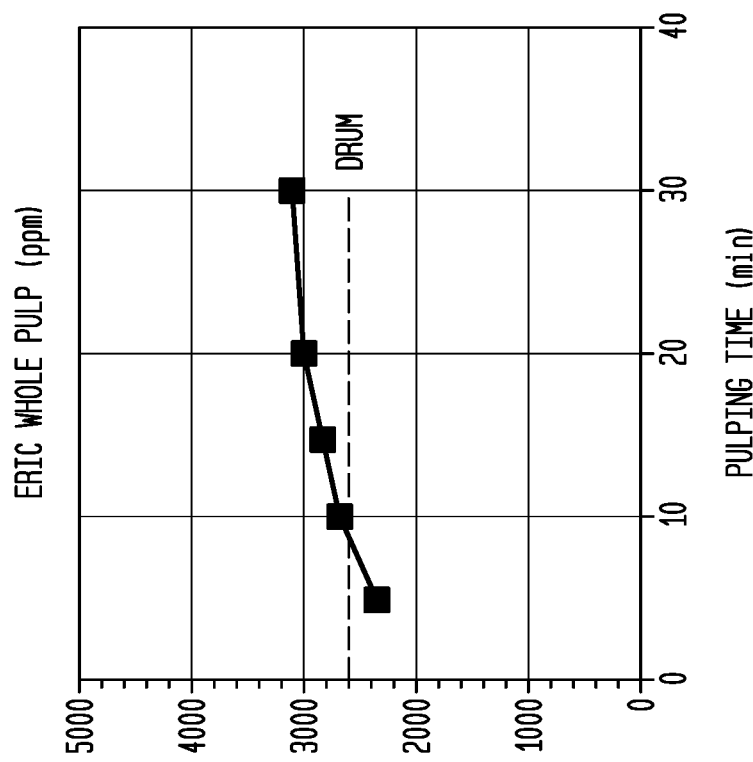

FIGS. 4A and 4B shows the ERIC and brightness levels of the pulps and the clear relationship between ERIC (fine ink) and loss of brightness. These experiments confirmed that low energy drum pulping insufficiently breaks up ink particles resulting in a "dirtier" pulp produced. It is also clear that high consistency pulping can be run too long so that the ink released from the fibers is excessively broken down into ERIC which attaches to the fibers resulting in a permanent brightness loss.

Figure 5:
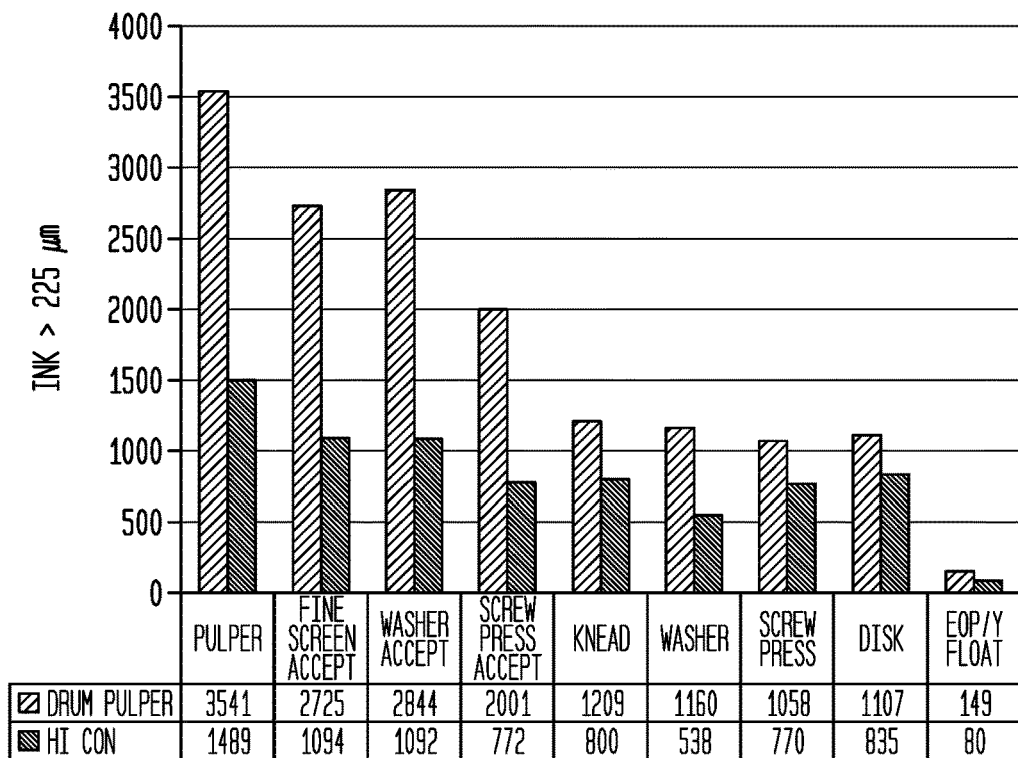
FIG. 5 is a histogram showing ink contamination for drum pulping and high consistency batch pulping.

FIG. 5 shows the visible ink profile of drum stock and High Consistency or Hi Con stock when deinked and bleached (ink specks larger than 225 µm in ppm). Unexpectedly the lower ink level of high consistency pulping persisted through the entire deink process. The high consistency pulp had a visible ink level 46% lower than the drum pulped wastepaper. This goes against conventional belief that the mechanical action of kneading and disk dispersion in subsequent processing would break up the visible inks remaining after drum pulping.

Figure 6:
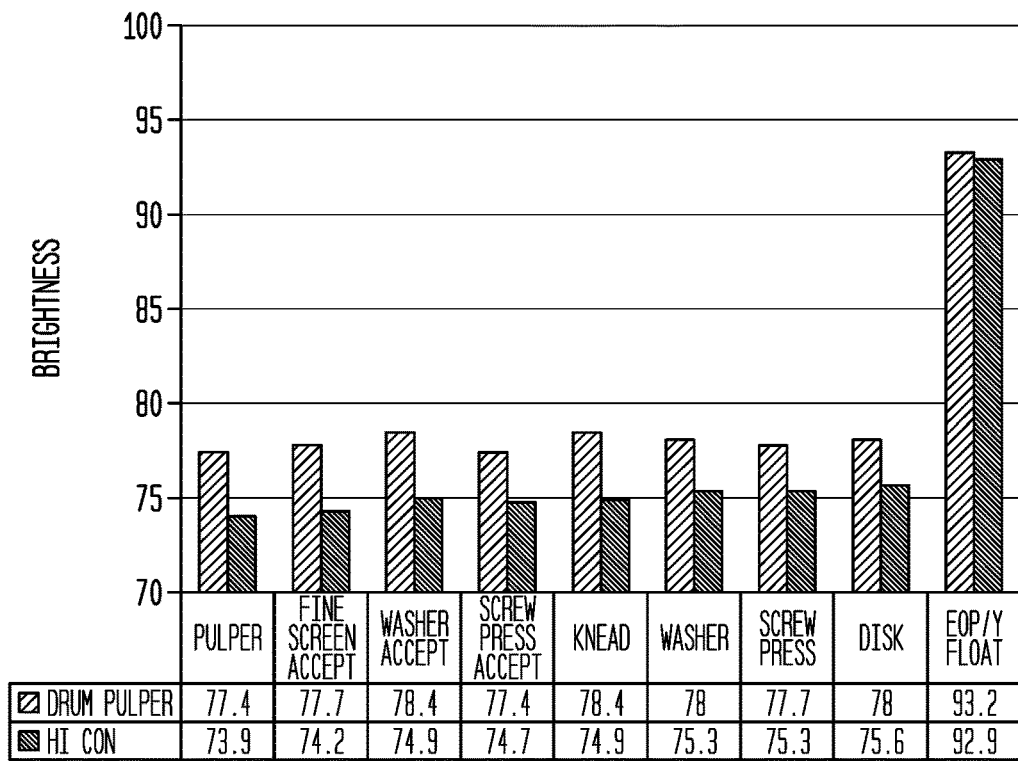
FIG. 6 is a histogram showing brightness for drum pulping and high consistency pulping.

FIG. 6 shows the brightness profile of the same pulps as FIG. 5. FIG. 6 shows the reduced brightness coming out of the high consistency pulper persisted throughout the deinking and bleaching process. The conclusion being the ink was smeared or reattached onto the fibers after about 12-15 minutes of pulping. This was a very unexpected result and significant for both deinking design and for pulping technology selection.

Further preliminary work included an analysis of deinking system performance versus pulping technology. It confirmed that high consistency pulping delivers a lower finished pulp visible ink level regardless of the deinking system technology. The work also showed high consistency pulping was often "over pulping" resulting in permanent brightness loss. With respect to drum pulping, it was found that drum pulping under-pulps, resulting in high ink and low yield.

Further work discovered more unexpected results. First, the power draw of the pulper motor, in terms of percent full load amps, showed significant batch to batch variability with no obvious cause. The actual power output of the motor, in kW (as measured by the variable speed drive), was added to the logged data (the "Pi" system) to assess causes of the variability. After an analysis of the Pi data additional trial work was done to develop the relationships between the pulp consistency, the rotor speed and the power application. The expectation was that the power demand would drop with pulper consistency. This is based on the principle that pulp viscosity, especially at higher consistency, will drop as more dilution water is added; lower viscosity was expected to facilitate motion of the pulp slurry around the pulper. However, it was seen that in many of the trials the power load on the motor increased as dilution water was added. This was totally unexpected. It is postulated that the pulp viscosity may have been so high that the pulp flow into the rotor became insufficient to fully load the motor; the rotor was being starved of pulp and flow was short circuiting in the system.

Figure 7:
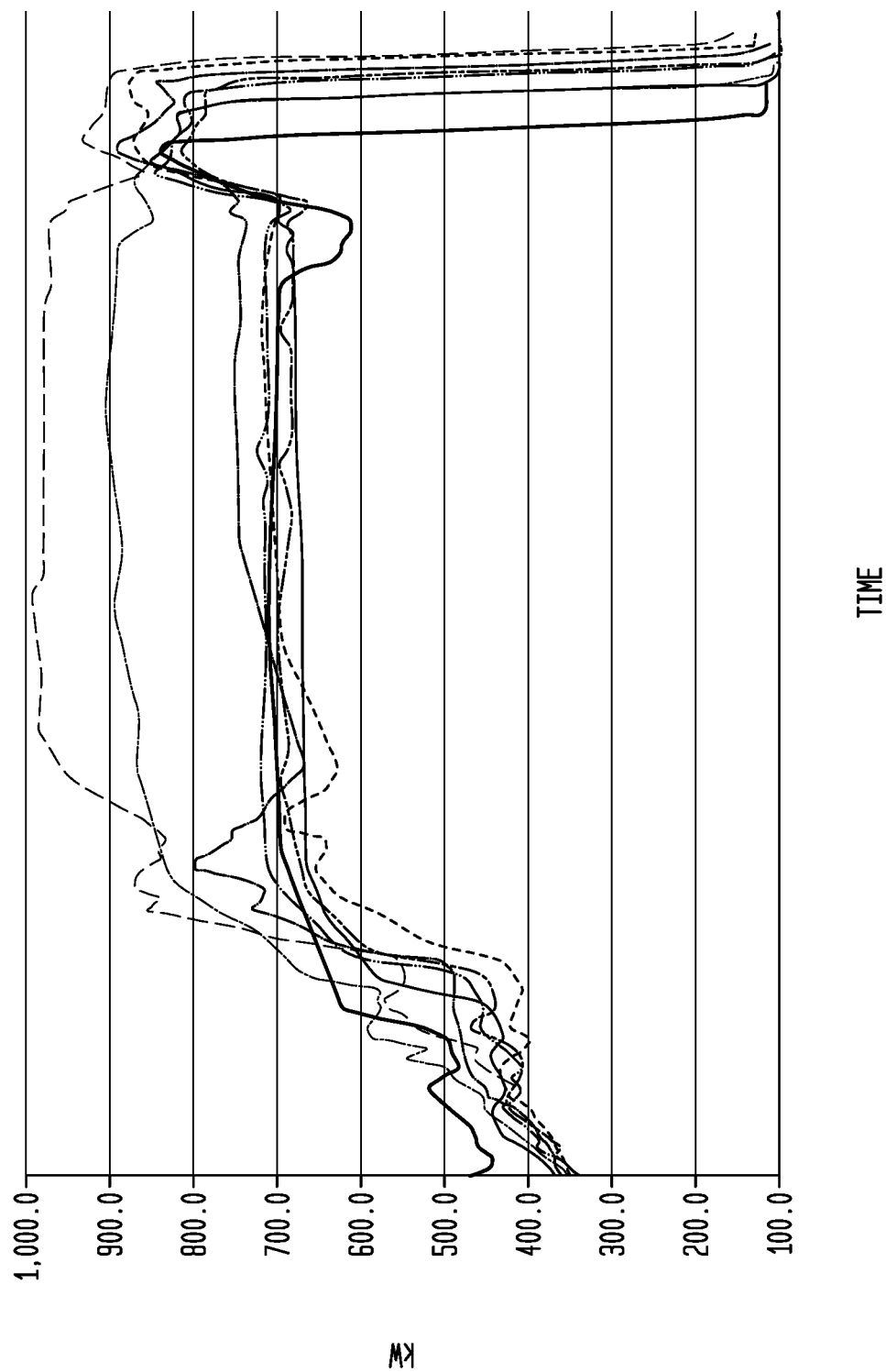
FIGS. 7-11 are plots of rotor power versus time for various high consistency pulping trials.

This short circuiting of the flow is not easily discernable from the power draw of the rotor motor—although it may be identified after the cycle is complete. In many cases there was an observed increase in power draw right after the post pulping dilution water ("topping water") is added. This power increase is a consequence of the dilution water reducing the viscosity sufficiently for the pulp to start moving and more fully engage the rotor. In some initial trials, also observed was that the visible ink level was dropping significantly after dilution water addition. This is explained by the mixing of the under pulped paper with the lower ink level over pulped paper after dilution. Note that the pulp can only be sampled from the top of the pulper, so only the under pulped fiber can be tested if the circulation stops. For example, FIG. 7 shows typical pulper power cycles on a commercial batch pulper. Many of the pulpers show both the flat power curve and the increase in power at the end of the cycle after addition of topping water. Two of the curves show a steadily increasing motor load followed by a reduction in power after the water addition. It is believed these two pulpers had adequate poloidal flow throughout the cycle. It should be noted that it would be very difficult to make real time adjustments to the viscosity (via water addition) in the very rapid 12 minute cycle based on the power curve data alone.

Ultrasonic testing verified the hypothesis that loss of flow in the pulpers is very common and significantly impacts the quality of the pulp produced. An analysis of the pulper operating systems, for example, the calculated water addition based on the wastepaper charge, showed there was very little variability in water addition, but high variability in product quality. This finding confirmed that variability was due in large part to the variability of the wastepaper itself.

It was determined that that high consistency pulping, utilizing a high energy, short cycle pulping method could produce a high yield, low ink level and high brightness pulp to feed into de-inking systems, while greatly reducing energy costs for recycling. Running closer to full motor load through consistency increases and/or higher loadings has the following benefits:

10-30% energy savings (running fewer pulpers)
Improved deinking
Reduction in pulping time Reducing pulping time to ~10 minutes has the following benefits:

40-50% power savings
Potential higher finished stock brightness

Another key feature is to use a variable power rotor in the pulper to allow the energy level to be controlled. A particularly advantageous operating mode is to use a variable speed pulper drive and reduce power after 10 minutes and during charge/idle times. This protocol has the following benefits:

30-60% power savings
Higher finished stock brightness
Easier logistics—can test pulpers @ 10 minutes while rotor is in idle mode
Mitigates downside risk of reduced pulper time (can add power, if necessary)
Reduced maintenance (less torque stress on rotor and gearboxes)
Improved dumping and detrashing cycle times The rotor speed will impact the time it takes to empty the pulper during fiber extraction and during the dump cycle—adjusting the speed of the rotor allows for faster turnaround times between batches of pulp. Typically, rotor speed is reduced well below speeds that circulate the slurry upwardly in the tub.

Another operating feature of the invention is to dilute the charge after 10 minutes or after a particular energy input to preserve brightness (keep ERIC low). This aspect provides the following benefits:

20-30% power reduction
Higher finished stock brightness
Lower ink count
2-5% Increased Yield Additional Trials Three pulper runs were tested at a pulping consistency of 15-18%. The wastepaper feed was higher brightness and quality intended for production of clean bright pulps. The pulpers were sampled at 2 minute intervals with the start time at the ramp up of the pulper rotor to full speed. Normally the total pulping time is set to 12 minutes but these pulpers were extended to develop a full Data Set. After 20 minutes a power curve was developed by adjusting the pulper speed to 800, 900, 1000, 1100, and 1200 rpms and noting the motor power draw. Approximately 1000 gallons of dilution water was then added to the pulper and the power curve repeated. Another 1000 gallons of dilution water was added and a 3rd power curve generated. Finally, the pulper was allowed to continue normally, dump and the next cycle started. For each set the testing after the power curves showed a significant drop in dirt and an increase in VSI. This was unexpected because the power addition was very low in the short time it took to run the power curves.

Figure 8:
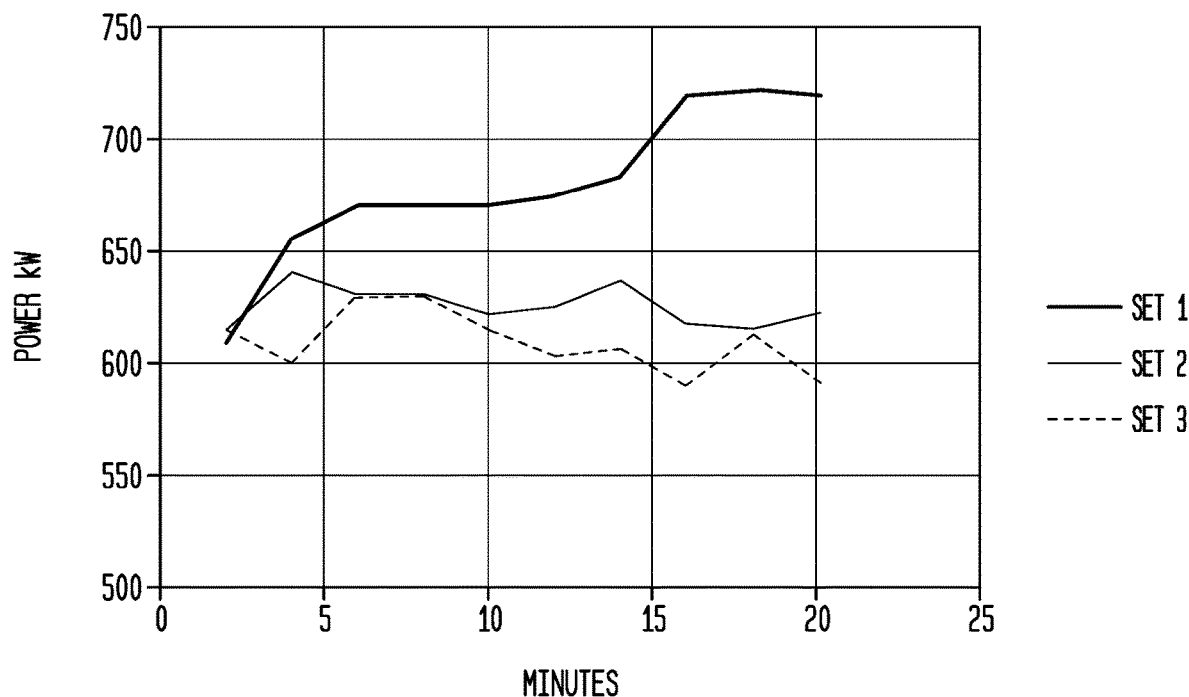
Figure 9:
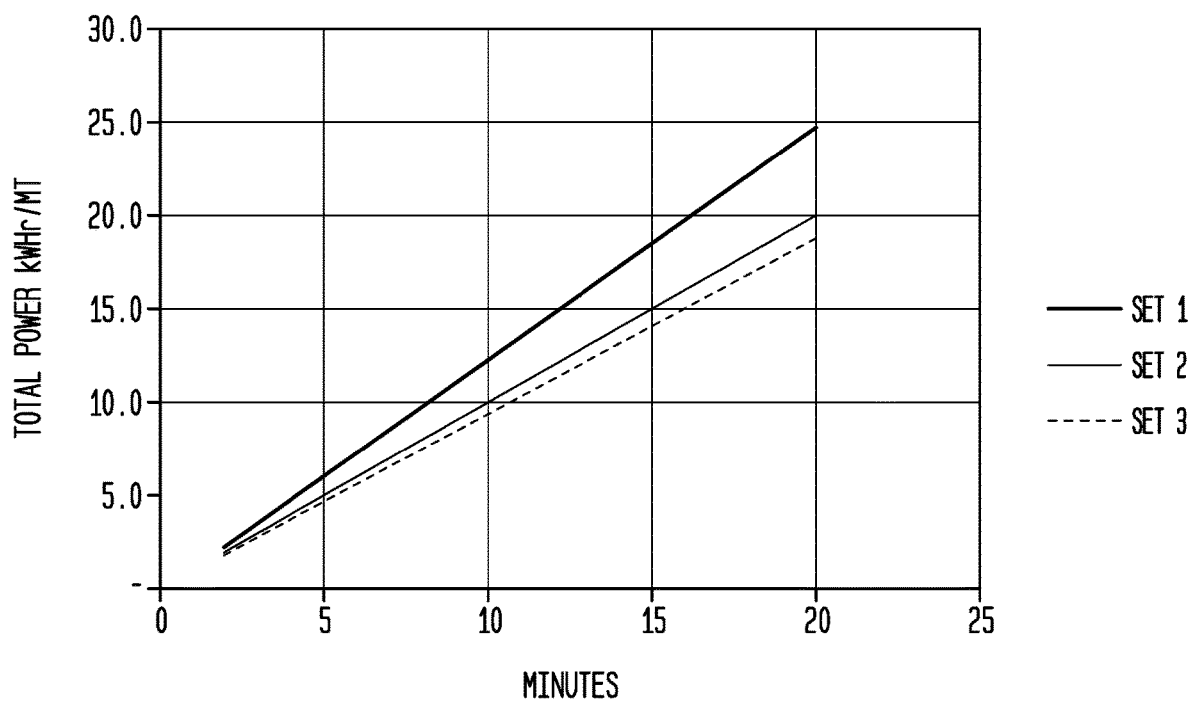

The actual power draw for each of these was plotted with time. Set 1 showed a different power curve compared to sets 2 and 3. The reason for the power curve difference was not known at the time but has been attributed to the total loss of poloidal flow in the pulper in sets 2 and 3 versus a partial loss in Set 1. Results appear in FIGS. 8 and 9.

Figure 10:
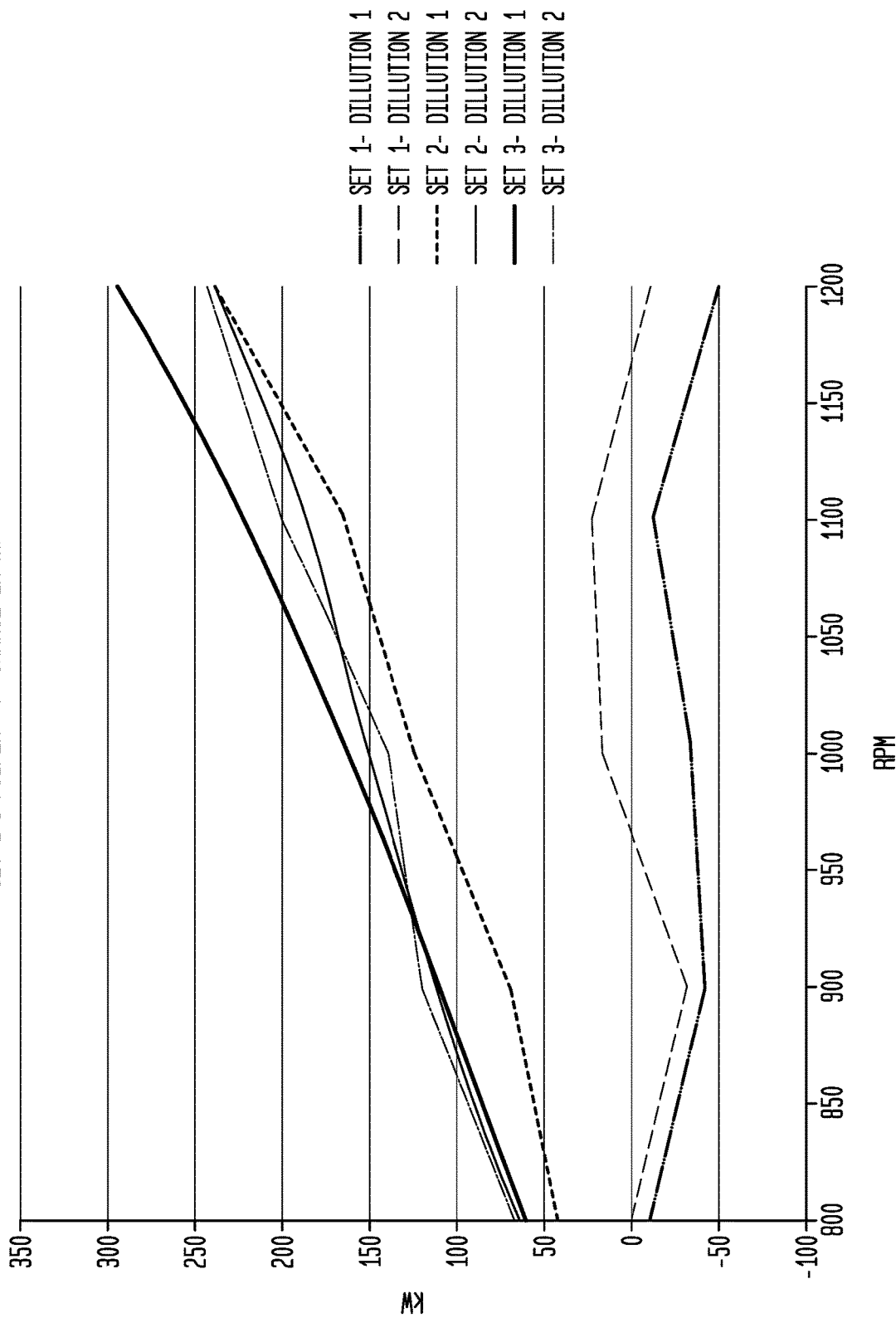

The loss of flow also explains the strange power curves for these pulpers. In FIG. 10 there is plotted the power curve change relative to the undiluted pulp for each set and dilution. Set 1 shows the power generally dropping with dilution—although less of a drop than expected. Sets 2 & 3 show the power significantly increasing with each dilution—an unexpected result.

Figure 11:
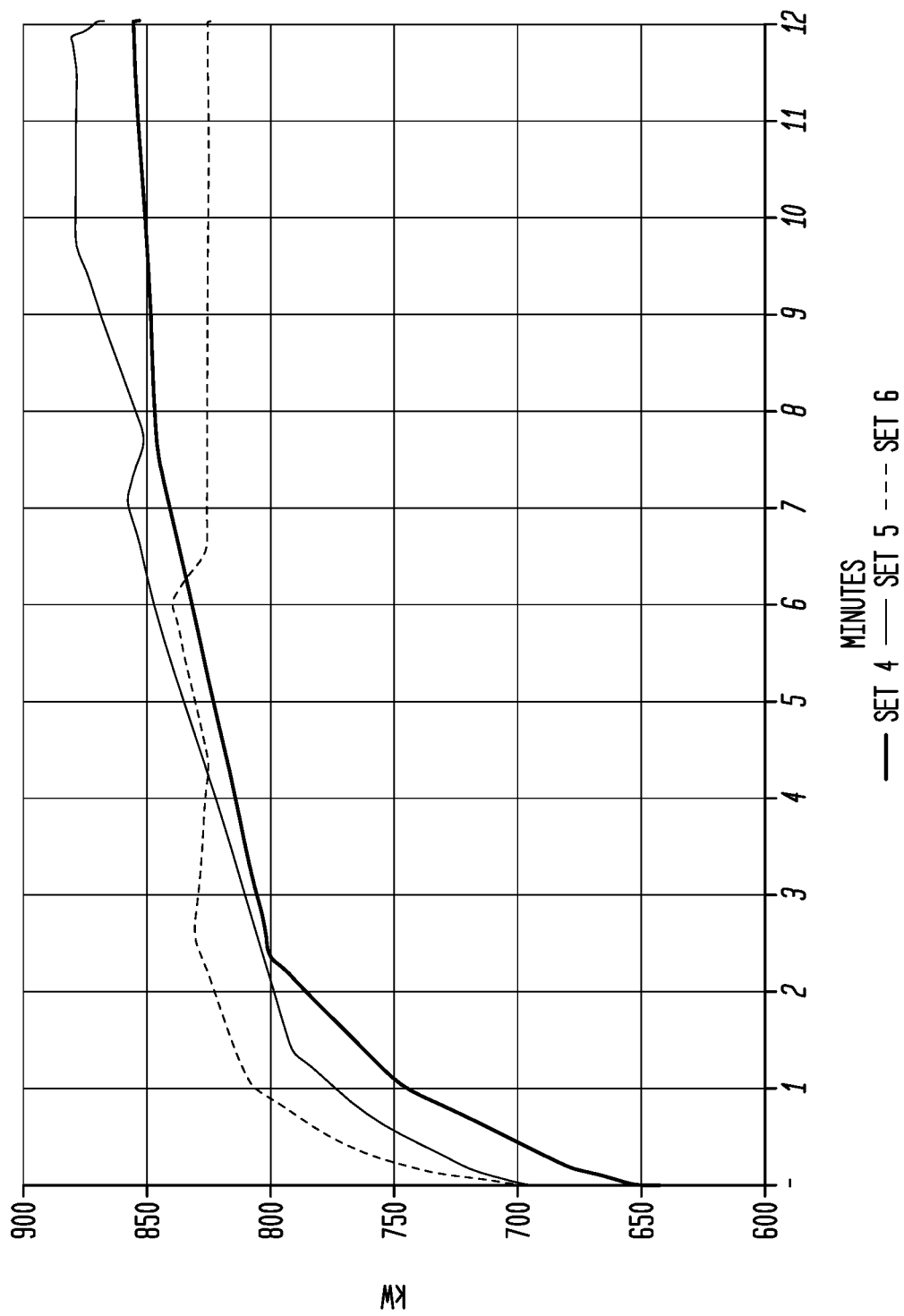

In another series of tests on commercial units, initially all pulpers were randomly tested for flow velocity at several points in the pulper tub. This data showed clearly the regular loss of significant flow in the tub after 3-5 minutes of pulping time. The testing also showed the short circuiting in the pulper where pulp at the bottom of the tub was cycling through the rotor. The next tests were done to monitor the flow at 3 points in the tub for several pulping cycles. The points were "bottom" which was approximately 12 inches above start of the vertical section of the pulper tub, "middle" which was 18 inches higher and "top" which was an additional 18 inches higher and roughly 1 to 2 feet below the top level of the pulp mass. Each point was tested every 90 seconds (a 30 second rotation between points) and the flows recorded. The start of the pulping, where the rotor motor was increased to 1200 rpm after charging, is the "0 Minutes" point for the following curves. FIG. 11 shows the pulper energy level for the three runs. The three sets show a significantly different energy curve during the pulping. Set 6 shows an almost flat energy curve throughout the pulping while Sets 4 & 5 show increasing energy with time (with two different slopes).

Figure 12:
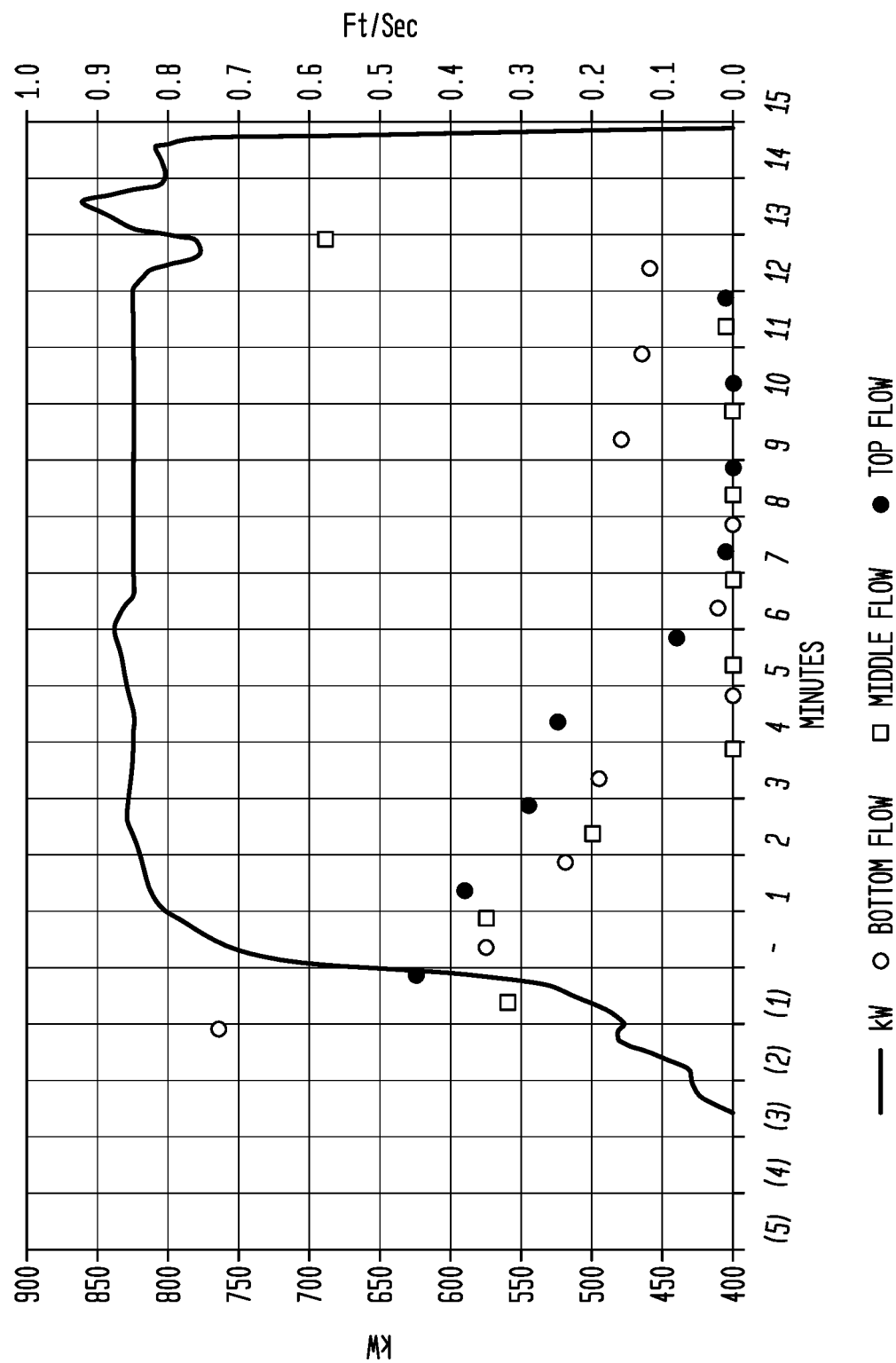
FIGS. 12 and 13 are plots of rotor power (left ordinate) and pulp slurry poloidal velocity (right ordinate) versus time for high consistency pulping trials.

The velocity data is plotted along with the power in FIG. 12 for Set 6. This set shows a flat energy curve and from the velocity data we clearly see the loss of flow in the middle and top test points after about 4 minutes. We also see some movement in the bottom which indicates short circuiting and over pulping of the fiber in the bottom of the pulper.

Figure 13:
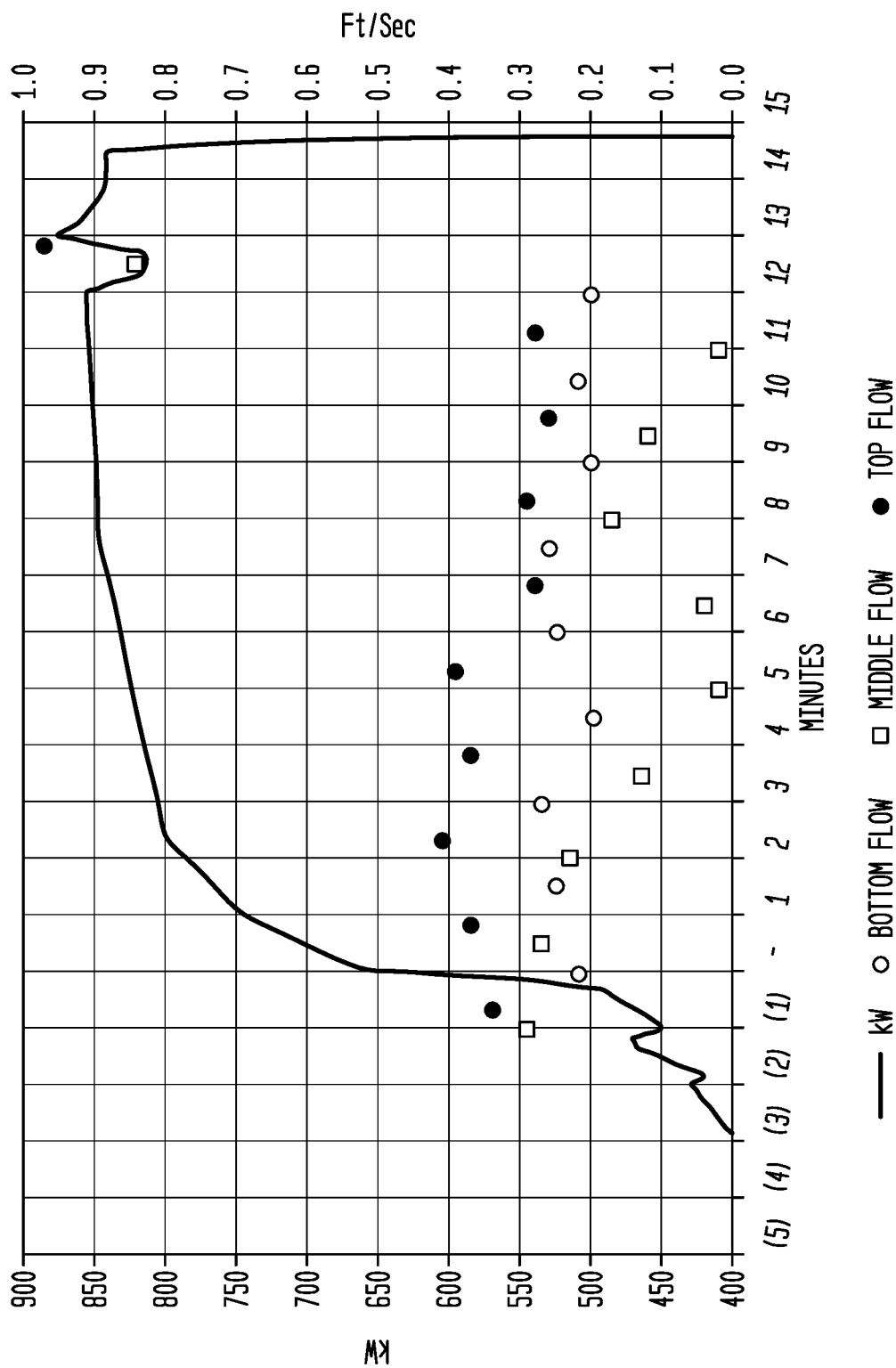
Figure 14:
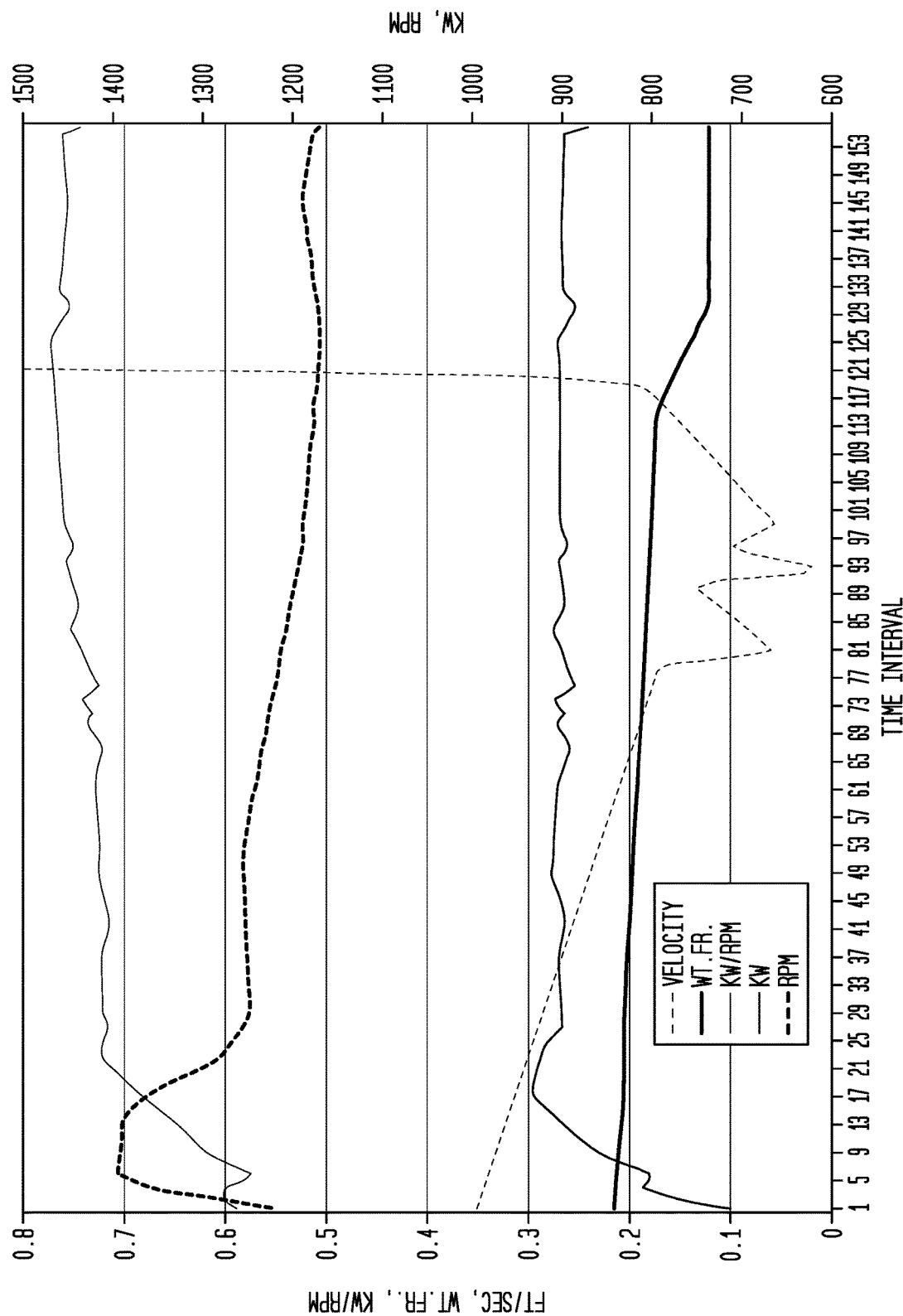
FIG. 14 is a plot of poloidal velocity, consistency, power/rpm, power and motor speed versus time for a high consistency wastepaper pulping trial.

The velocity data is shown in FIG. 13 for Set 4. This set shows some flow throughout the cycle with the middle falling below about 0.1 ft/sec often during the cycle. This set also shows an increasing energy draw on the rotor which is interpreted as consistent pulping throughout the cycle. Also note the small increase in energy applied compared to Set 6.

Figure 2:
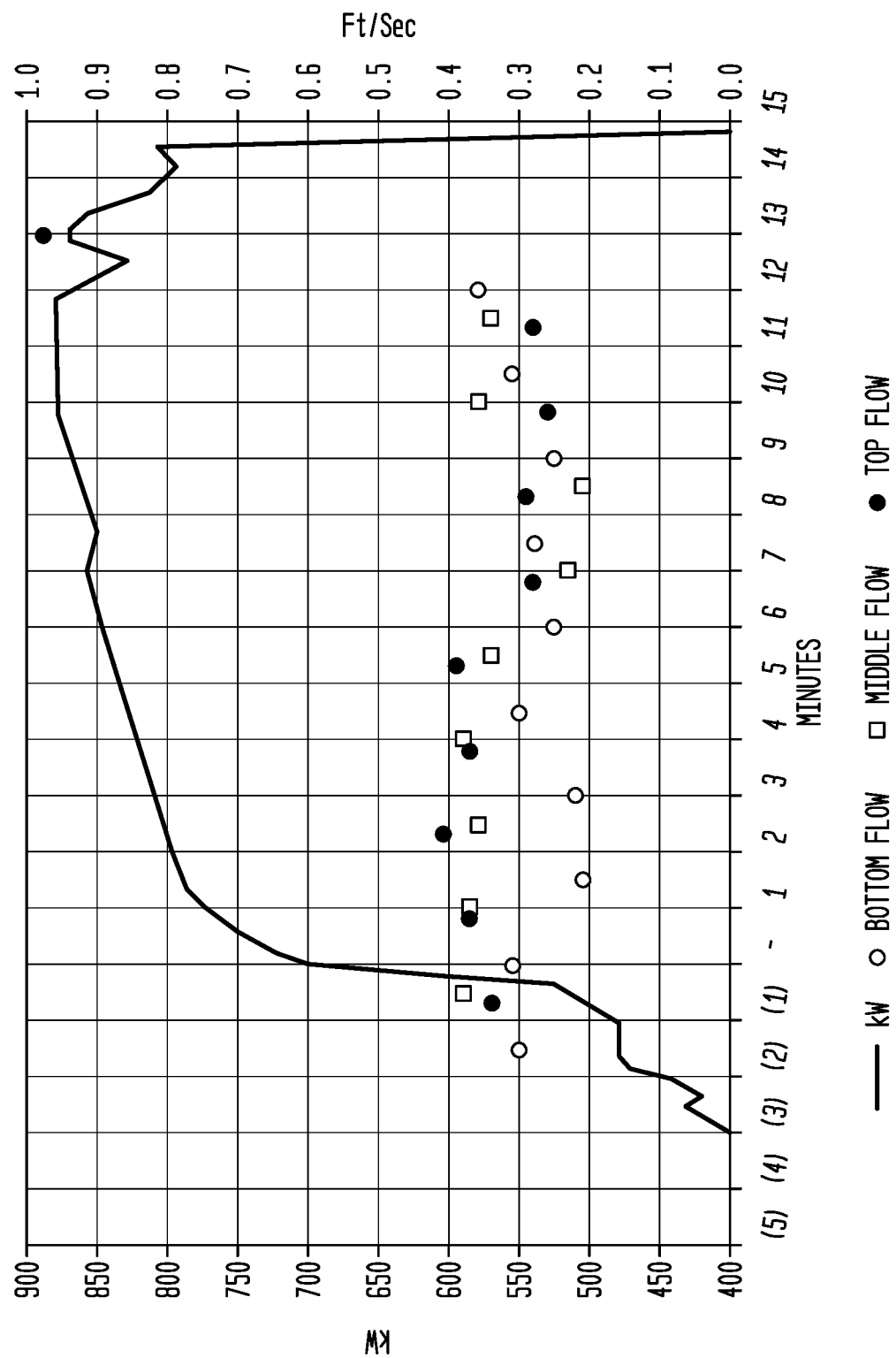
FIG. 2 is a plot of rotor power (left ordinate) and pulp slurry poloidal velocity (right ordinate) versus time for a pulping cyclic executed in accordance with the present invention.

FIG. 2, for Set 5, shows the best pulping achieved of the three tested. This set had a steadily increasing energy application with sufficient flow in all regions of the pulper throughout the cycle. Set 5 is considered to be optimally executed.

A typical operating sequence for the pulper is as follows. The wastepaper blend, initial water charge, charging sequence and other parameters are held constant. Beginning with an empty pulper, the following steps are carried out:
1. The rotor motor speed is set to a constant 360 rpm (36 rpm rotor speed with a 10:1 gear ratio);
2. The weighing conveyor is charged with a target 25,000 lb. of wastepaper;
3. A calculation is done based on the actual wastepaper weight to determine the amount of water necessary to get to a 21.5 wt % calculated consistency and 85% of this volume added to the pulper;
4. The pulper motor is set to 1200 rpm, rotor speed 120 rpm;
5. The conveyor is started and wastepaper added to the pulper over about a 1 to 2 minute timeframe;
6. The remaining 15% of the calculated water charge is added to the pulper;
7. The pulper motor is placed into power mode and allowed to adjust the speed to get to a target 900 kw, at the same time an integrator is started to accumulate the total kWHr/ton;
8. The pulping cycled continue until the target kWHr/ton is achieved;
9. The post pulping dilution water was added to the pulper to achieve a calculated 12 wt % consistency and the pulper run in power control mode for 3 minutes to mix;
10. The pulper is switched out of power mode into speed mode, running the motor at 1000 rpm or so and the charge is was removed and the pulper emptied and trash removed in preparation for the next run.

In still yet further trials, a series of three (3) additional runs, Data Sets 7, 8 and 9, were run on a pulper having the general configuration of FIG. 1 using the procedure generally indicated immediately above. Poloidal velocity was measured using an upper Doppler sensor. For these three runs an additional step was implemented at step 7 for purposes of testing and characterizing the pulping operation. Under rotor dilution water was added at a controlled rate during the pulping cycle to develop combined power, speed and velocity control. For run #7 the addition rate was set to 200 gallons per minute for the first 11 minutes of the pulping cycle. During the run the control system recorded all control data at 6 second intervals indicated by the numerals on the abscissa of FIG. 14.

The wt. fr. (wt % or consistency÷100) line shows the steady reduction in calculated consistency as the under rotor water is added. It also shows the inflection point at the end of the pulping cycle where post pulping dilution water is added.

The kW and RPM lines show the motor at 1200 rpm at the start of the cycle and the going to 1400 until the power reaches the target 900 kw. We then see the rotor speed decrease as the power is held constant. The kW/RPM line combines these two and shows the applied power per revolution increase throughout the pulping cycle until it reaches a maximum around about 0.77 kW/RPM.

The velocity curve shows the speed of the pulp as it rises up the pulper wall (based on the ultrasonic doppler meter). This curve is surprising and unexpected in several ways. First, there appears to be no relationship between the rotor speed and the wall velocity when one would expect a higher rotor speed to result in a higher rising speed. Next, the poloidal velocity curve shows a linear reduction from the beginning to about period 75 (6 second intervals) and then a period of instability followed by a rising curve. The steady reduction at the beginning is somewhat expected as the pulp mass is thickening as the fibers are individualized and starches and other additives are broken down. The sharp increase in velocity at the end of the cycle (after the post dilution water addition) is also expected as the pulp viscosity is dramatically reduced from the water addition. However, the period of instability followed by an upward trend (periods 75-100) is unexpected. Data Sets 8, 9 were generated using the same procedure and showed a surprisingly similar curve.

Figure 15:
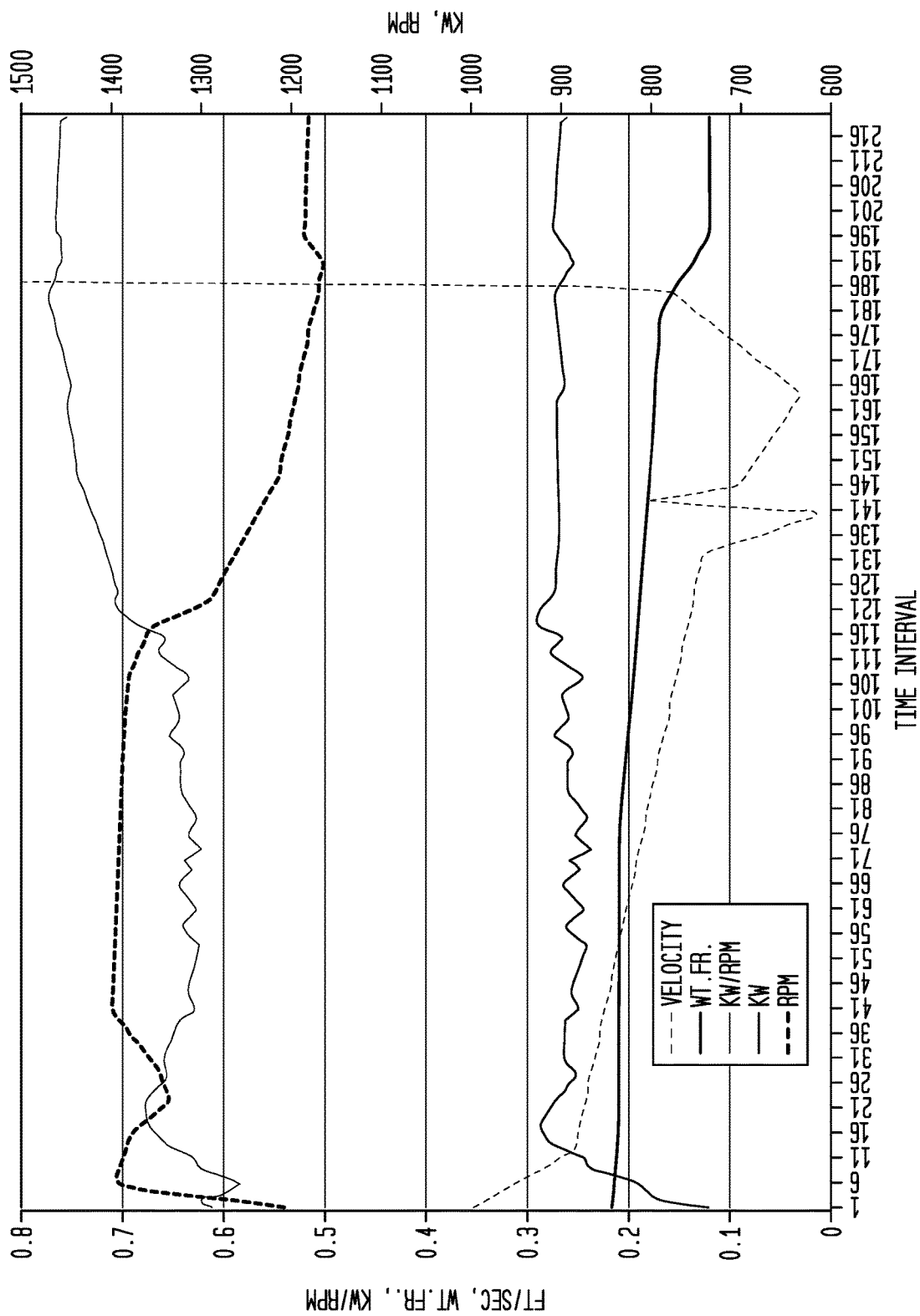
FIG. 15 is a plot of poloidal velocity, consistency, power/rpm, power and motor speed versus time for another high consistency wastepaper pulping trial.

Data Set 8 results are shown on FIG. 15. While set up and run the same as Data Set 7 the RPM and power lines show this pulper did not get to target power (900 kw) until around period 100. This is an example of the wastepaper variability discussed above, although the same wastepaper grade was used as in Data Set 7, the same amount of water and the loading was used, it appears a different viscosity was exhibited. As in Data Set 7, we see a steadily decreasing velocity until we hit a point of instability around period 130. We see the same instability and then a steadily rising velocity until the large increase after the addition of post dilution.

Figure 16:
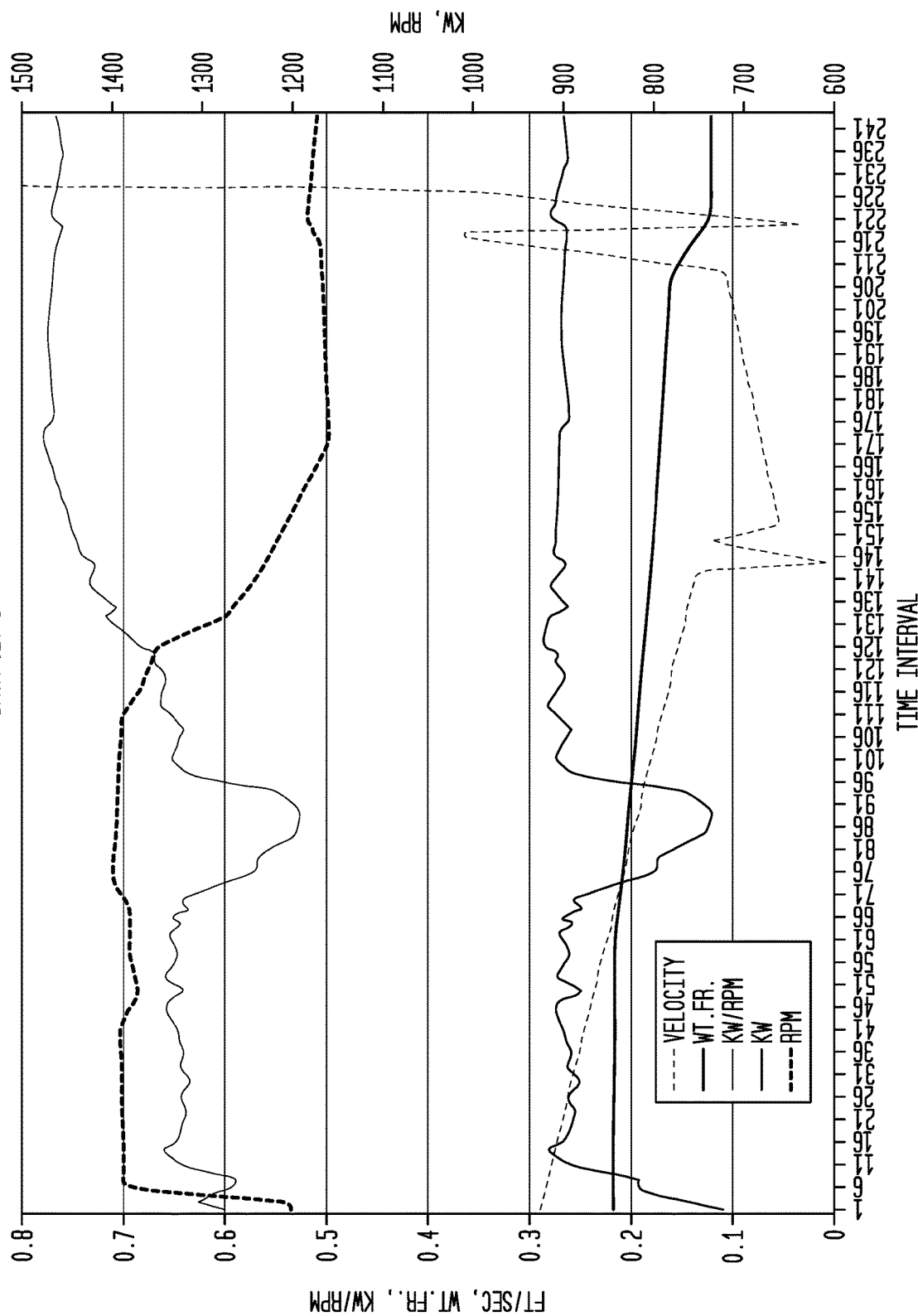
FIG. 16 is a plot of poloidal velocity, consistency, power/rpm, power and motor speed versus time for yet another high consistency wastepaper pulping trial.

In Data Set 9, FIG. 16, we see the similar velocity curve with instability beginning around period 140 and then rising velocity after period 150. Note, also, the wt. fr. curve inflection after interval 62. Prior to interval 62 the under rotor water flow was below target and the target flow of 200 gal/min was hit after interval 62. After this we see the motor kw drop off for a number of periods then hit target after period 100. It appears the dilution water was short circuiting somewhat after the flow was established and staying around the rotor and then it then mixed into the pulp uniformly. Despite the non-uniform water addition, there is shown a similar velocity curve as with Data Sets, 7, 8. It is also seen that the kw/rpm values max out around 0.78 and then hold steady no matter the dilution water added.

Figure 17:
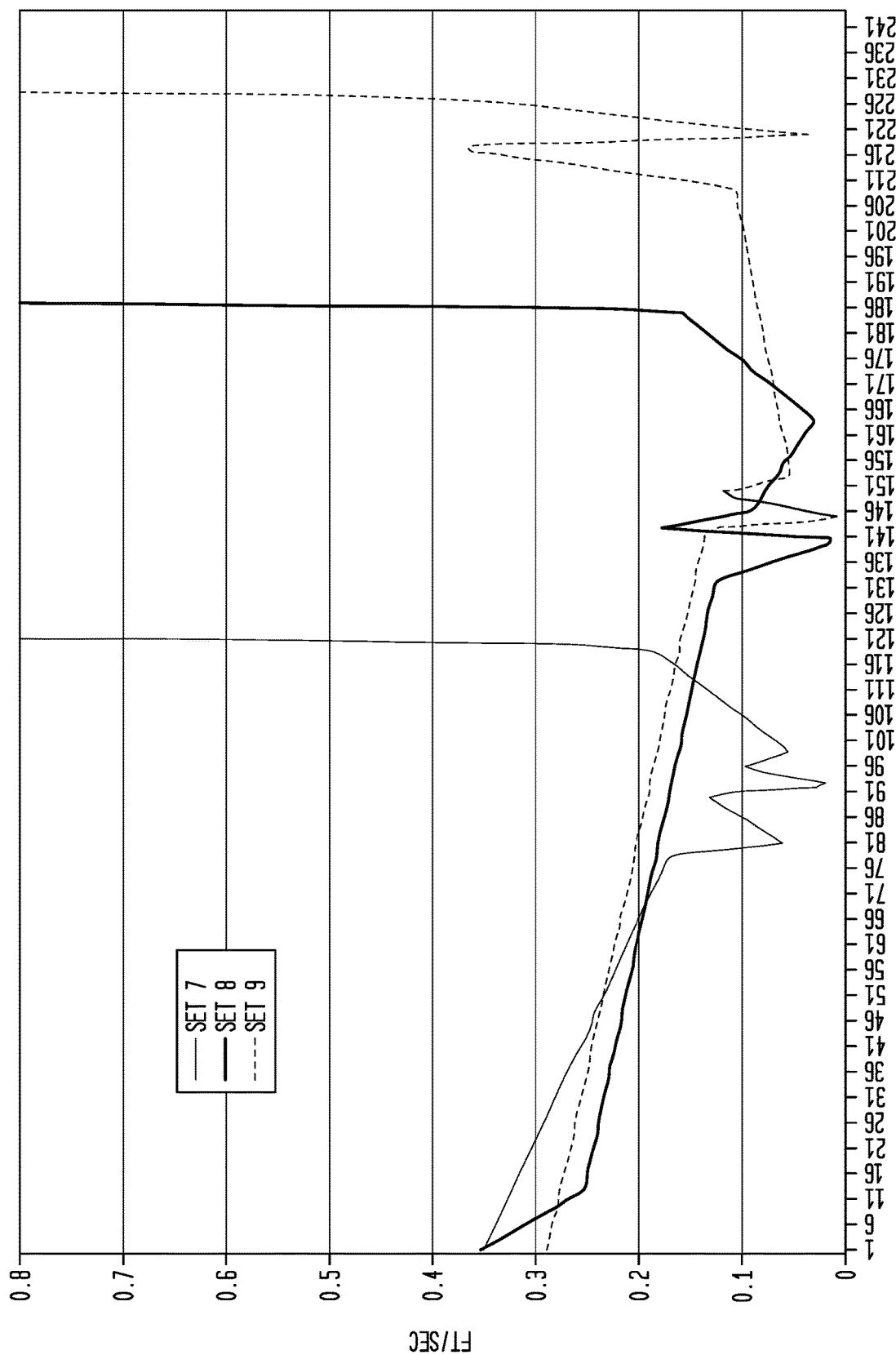
FIG. 17 is a plot of poloidal velocity versus time for the three (3) trials of FIGS. 14-16.

FIG. 17 presents velocity data for all three Data Sets 7, 8, 9. They are very similar despite some time shifting due to differing pulping progress over time, most likely due to wastepaper variability, since all other features of the process are essentially the same.

Figure 18:
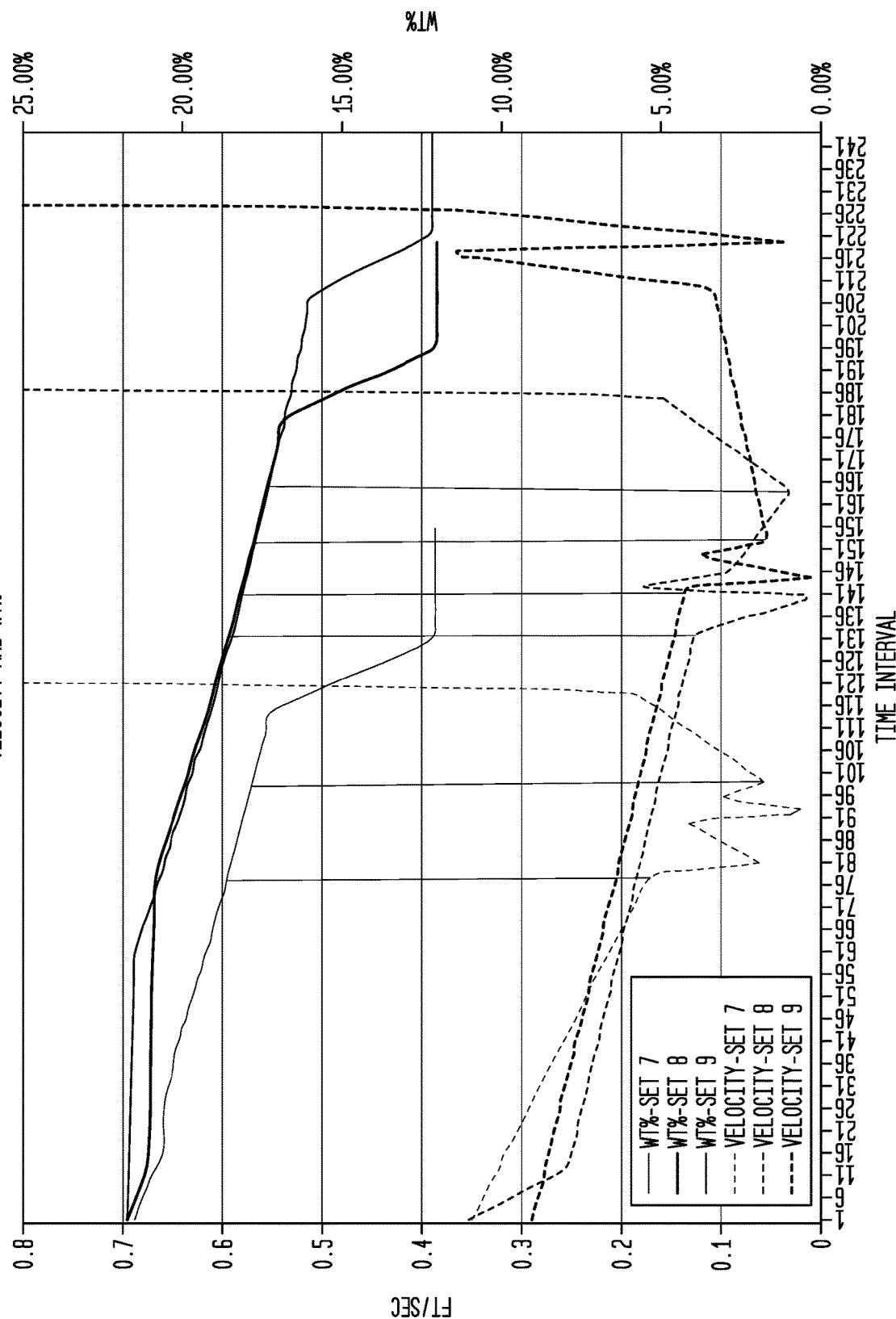
FIG. 18 is a plot of poloidal velocity and consistency for the three (3) trials of FIG. 14-16.

FIG. 18 shows the velocity curves along with the calculated wt % data for Data Sets 7, 8, 9. Vertical lines project the inflection points in the velocity curves to consistency to show that while the curves have similar shapes, there is actually a different inflection point for each velocity curve. This indicates that the consistency is not the driver here but rather the viscosity. That is, at a given wt % the viscosity of a wastepaper mixture will vary due to variation in the wastepaper fiber mix and additives; even though the wastepaper is nominally all the same "grade" of wastepaper.

In some cases it is convenient to use an under rotor addition point for water, since a typical high consistency pulper includes a suitably sized gallons/minute inlet at this location (up to 300 gal/minute).

Optimal pulping may be just before the unstable velocity point and inflection where additional water causes the velocity to increase. One preferred control scheme is a feedback control scheme with three target values: motor power+rpm+ velocity. Water addition is used to approach target values. One set of parameters during pulping using this approach (for a typical wastepaper charge) is around 900 kw motor power, +1200 rpm motor speed (120 rpm rotor speed)+0.2 ft/sec poloidal velocity.

Another preferred control scheme is to use two target values: kw/motor rpm above 0.7 (or above 7 kw/rotor rpm) and velocity=0.2 ft/sec.

Still yet another option is to pulp to just after the poloidal velocity instability point, i.e. where additional water shows an increased velocity. In practical terms this might be an easier place to control pulping with an appropriate algorithm.

Figure 19:
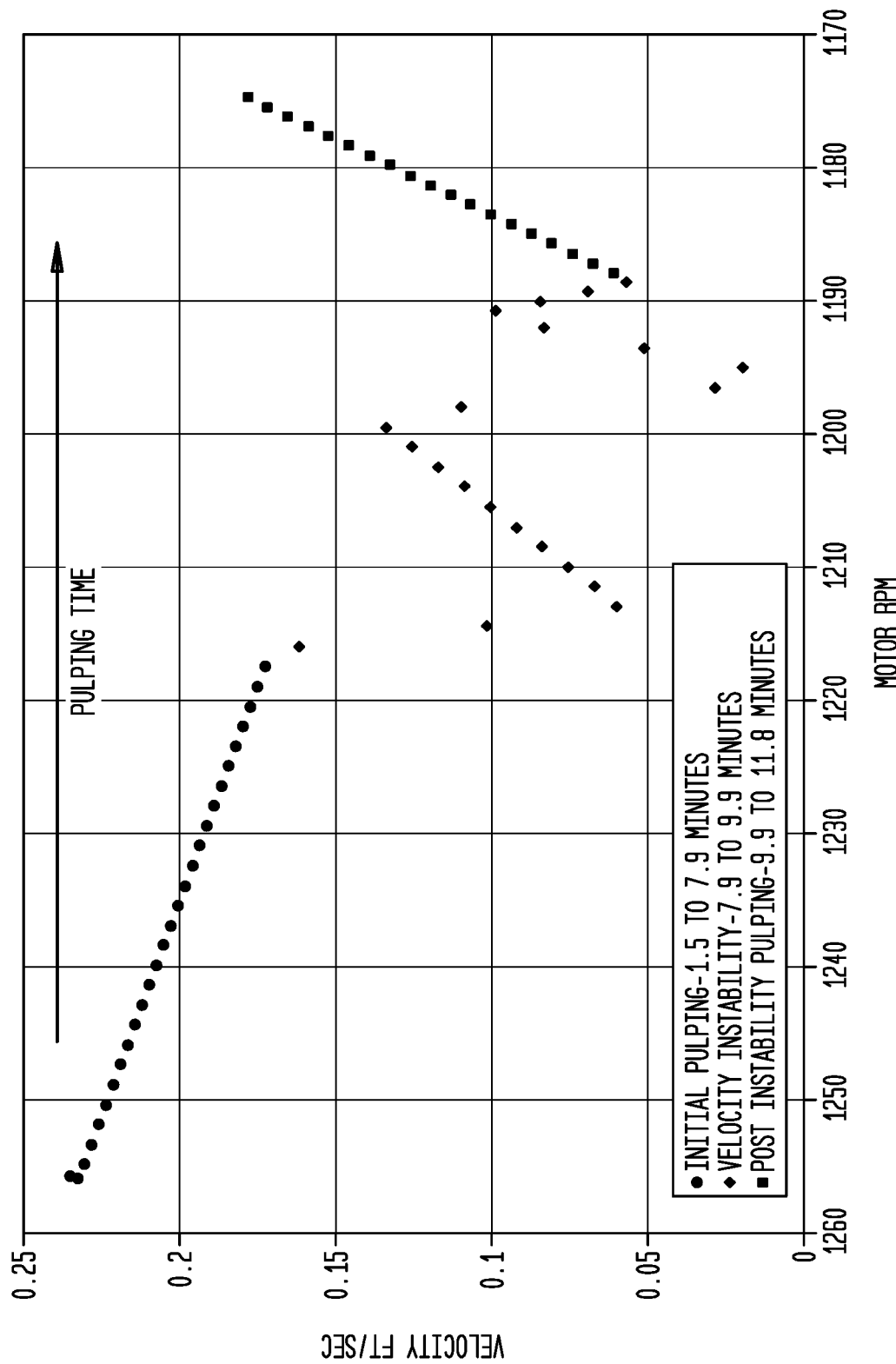
FIG. 19 is a plot of poloidal velocity versus motor RPM for Data Set 7, with increasing pulping time indicated on the graph.

The foregoing protocols are based, in part, on the unexpected results seen with the invention. Pulping characteristics are perhaps more readily observed by plotting poloidal pulp slurry velocity versus motor RPM for Data Set 7, as is seen in FIG. 19. During the first 8 minutes or so of pulping, poloidal slurry flow decreases linearly from the start of wastepaper pulping to about 8 minutes as the motor speed decreases. The relationship between motor RPM and poloidal velocity suggests that relatively more energy is being applied to pulping the wastepaper than maintaining or increasing velocity of the slurry. At about 8 minutes a poloidal slurry flow instability occurs over a period of 2 minutes or so as poloidal slurry velocity fluctuates before stabilizing again and increasing linearly as motor speed decreases slightly and water is added, indicating that relatively more energy is now being applied to increase the velocity of the slurry rather than being applied to pulp the wastepaper.

High consistency batch pulping starts out as a mixture of wastepaper pieces and water. The viscosity is nearly that of water and the flow is very high. As the paper breaks down into smaller pieces+individual fibers+broken down ash and additives the viscosity increases. The higher viscosity puts more drag forces on the rotor which increases the power required to spin the rotor. The higher viscosity also slows the flow of pulp into the rotor due to gravity which can starve the rotor decreasing the drag on the rotor and thus reducing power. So in the area where the velocity is falling the viscosity increase from the breakdown of the wastepaper is higher than balanced by dilution water addition reduces viscosity. Eventually, a point is reached where the breakdown slows (the pulping is nearly finished). Now additional water results in a decrease in viscosity and the velocity increases. The power to rpm ratio, kw/rpm, is lower at the beginning of pulping and then increases as both the viscosity and engagement of the rotor increase. Around the inflection point in velocity the kw/rpm ratio starts to level out and reaches a maximum as more water is added.

The velocity instability observed may be due to a change in the nature of the flow the pulp. It may be that the pulp around the rotor is actually becoming fluidized. The partially fluidizes pulp causes flow variation as seen in the velocity meter bouncing. When a point is reached where there is a low enough viscosity that the pulp becomes a more stable fluid, the velocity starts rising. This is also the point where the power addition of the rotor stabilizes (as indicated by a flat kw/rpm).

Pulping is likely most efficient just before the velocity instability point. When the pulp becomes fluidized (if indeed it is) the specific energy input to the fiber decreases—less fiber "work" and more of the energy is applied to pushing the pulp around. The velocity changes support this theory. Prior to the transition point the velocity is dropping in the face of increased power addition so the power is going into the fiber and not into poloidal flow. After the transition the energy increasingly goes into moving the pulp mass faster to less energy is going into the individual fibers.

Following in Table 1 are typical and preferred parameters for operating a high consistency batch pulper of the class described below in connection with FIG. 1.

TABLE 1

High Consistency Batch Pulper Operating Conditions

| Quantity | Typical Range | Preferred Range |
| --- | --- | --- |
| Charge Consistency (%) | 10-30 | 12-25 |
| Energy Input (kwh/MT) | 5-20 | 9-11.5 |
| Pulping Duration (min) | 6-25 | 7.5-20 |
| Poloidal Velocity (ft/sec) | 0.05-0.6 | 0.1-0.4 |
| Rotor Speed (RPM) | 60-180 | 75-140 |
| Power Input (kw) | 700-1500 | 800-1200 |
| Power/rotor RPM Max (kw/RPM) | 6-10 | 7-9 |

Preferred Operation

The present invention is suitably implemented using an apparatus shown schematically in FIG. 1. In FIG. 1 there is shown a high consistency batch pulper 10 which includes a tub 12 with a sidewall 15 provided with internal baffle plates 14, 16, as well as a trash dump valve 18 and a rotor 20. Rotor 20 is connected to a motor 22 provided with a variable power drive indicated generally at 22A by way of a gearbox indicated at 24.

Also provided are a plurality of Doppler velocimetry sensors 26, 28, 30 located respectively near the bottom, middle and top of sidewall 15 of tub 12. In particular, sensors 26, 28, 30 may be located respectively at from 10-20% of a height, H, at from 40-60% of a height, H, and from 70-90% of a height, H, wherein H is the height above a bottom 35 of tub 12 and a normal operating level 33 indicated on FIG. 1. The sensors 26, 28, 30 may be circumferentially staggered, if so desired, in order to detect flow at different portions of tub 12; that is, at different positions around the circumference. Poloidal flow is thus conveniently characterized by upward velocity of the slurry near the wall of the pulper in the direction indicated by arrow 34 using one or more directional Doppler effect ultrasonic flow meters which measure pulp slurry velocity in the direction indicated.

In operation wastepaper and water are charged through the upper portion 32 of tub 12 to a normal operating level 33 and the pulper is operated at a pulp consistency of anywhere from about 10% to 30% while rotor 20 applies shear to the pulp slurry, causing the pulp slurry to circulate poloidally at a poloidal velocity indicated at 34 of anywhere from 0.1 ft/sec or above, up to 1 ft/sec or so. Rotor 20 is operated near maximum power and poloidal velocity 34 is monitored. If poloidal velocity 34 falls below a threshold of about 0.1 ft/sec, dilution water is added to cut the viscosity of the pulp slurry and maintain poloidal velocity 34 at 0.1 ft/sec or above. Adding dilution water to maintain poloidal velocity 34 also keeps rotor 20 operating at or near full power to maximize energy input to the pulp. Typically the energy input to the wastepaper is in the range of from about 5 to 40 KwHr/MT over a pulping operating cycle of 10 minutes or so. At the end of pulping dilution water is added and the pulp is pumped out through an extraction plate (not shown). Tub 12 is rinsed a few times and then a trash dump valve 18 opens and all of the large trash is flushed out of the pulper—wires, wood, plastic bottles, etc. The trash goes to a trommel screen where residual fiber is washed off and recovered. The large trash then goes to landfill or, in some instances, plastic and metal recovery.

There are numerous ways to achieve this control with the optimal configuration dependent on the pulping equipment, wastepaper type and desired pulping outcome.

One exemplary method comprises the following steps:

1. The pulper is charged with water (based on the actual weight of the wastepaper and the target consistency) and then the wastepaper added while the rotor is turning at a moderate speed.
2. Once the wastepaper and initial water charge are entirely in the pulper the rotor is ramped to maximum speed limited only by the maximum power draw of the drive motor. The rotor speed is moderated during the pulper cycle if necessary to maintain motor power draw less than 100% of the maximum. Depending on the system design and loading, the power may begin to drop at some point as the speed is ramped up. It is preferable to utilize a smart controller algorithm to adjust the maximum speed if there is a drop in power indicative of poor circulation and/or rotor cavitation.
3. An accumulator for specific energy applied is started at the beginning of the pulping. The accumulator uses the actual pulp weight and the measured kW output of the motor to calculate specific energy.
4. The linear velocity at several points in the pulp mass is monitored and additional aliquots of dilution water are added to the pulper to maintain linear velocity above about 0.03 m/sec (0.1 ft/sec) at all points in the rising pulp mass.
5. Once the target specific energy is reached the "topping" dilution water is added and the rotor speed reduced to minimize the energy application to the pulp and prevent over pulping and the potential brightness loss.
6. The pulp is extracted from the pulper tub. The rotor speed is adjusted to give the shortest extraction time.
7. The trash is removed (unpulped wastepaper and non-fiber contaminants too large to get through the extraction plate) and the system prepared to start the next cycle.

Another exemplary method comprises the following steps:
1. The pulper is charged with about 40% to 60% of the total water required (based on the actual weight of the wastepaper and the target consistency) and then the wastepaper added while the rotor is turning at a moderate speed.
2. Once the wastepaper and initial water charge are entirely in the pulper the rotor is ramped to maximum speed limited only by the maximum power draw of the drive motor. The rotor speed is moderated during the pulper cycle if necessary to maintain motor power draw less than 100% of the maximum. The maximum speed may also be limited if there is excessive splashing in the pulper at the lower level. This is indicated by either an excessive velocity reading by the flow meter or as an excessive fluctuation in the flow reading.
3. An accumulator for specific energy applied is started at the start of the pulping. The accumulator uses the actual pulp weight and the measured kW output of the motor to calculate specific energy.
4. The linear velocity at several points in the pulp mass is monitored and additional dilution water is added to the pulper to maintain linear velocity above about 0.03 m/sec (0.1 ft/sec) at all points in the rising pulp mass. Water addition may be continuous or in aliquots.
5. Once the target specific energy is reached the "topping" dilution water is added and the rotor speed reduced to minimize the energy application to the pulp and prevent over pulping and the potential brightness loss.
6. The pulp is extracted from the pulper tub and the system prepared to start the next cycle.

Still yet another exemplary method involves a two stage pulping. The initial pulping is at high consistency and the second stage is at a lower consistency. The lower consistency stage allows a higher total energy input with less risk of brightness loss. This protocol will increase the yield and reduce the dirt level:
1. The pulper is charged with about 40% to 60% of the total water required (based on the actual weight of the wastepaper and the target consistency) and then the wastepaper added while the rotor is turning at a moderate speed.
2. Once the wastepaper and initial water charge are entirely in the pulper the rotor is ramped to maximum speed limited only by the maximum power draw of the drive motor. The rotor speed is moderated during the pulper cycle if necessary to maintain motor power draw less than 100% of the maximum.
3. An accumulator for specific energy applied is started at the start of the pulping. The accumulator uses the actual pulp weight and the measured kW output of the motor to calculate specific energy.
4. The linear velocity at several points in the pulp mass is monitored and additional dilution water is added to the pulper to maintain linear velocity above about 0.03 m/sec (0.1 ft/sec) at all points in the rising pulp mass. Water addition may be continuous or in aliquots.
5. Once an initial target specific energy has been reached dilution water is added to decrease the consistency of the batch below about 10% so that ink deposition due to additional pulping is reduced or eliminated altogether.
6. The pulping continues until the second specific energy target has been reached then the topping dilution water is added and the rotor speed reduced to minimize the energy application to the pulp and prevent over pulping and the potential brightness loss.
7. The pulp is extracted from the pulper tub and the system prepared to start the next cycle.

Figure 20:
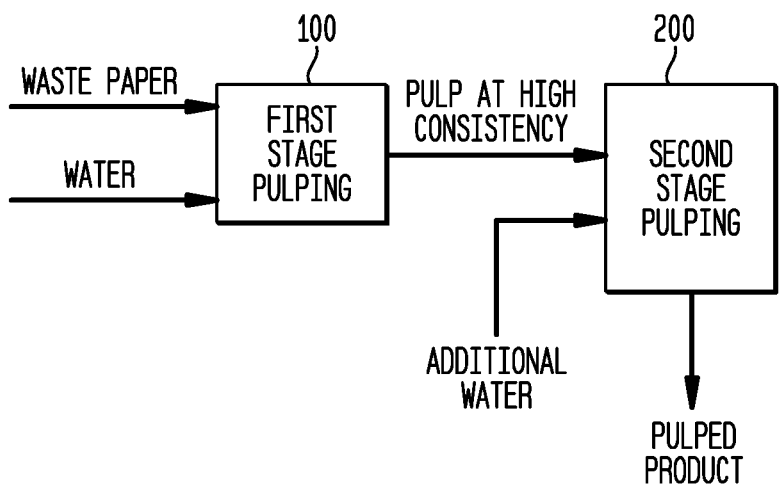
FIG. 20 is a block diagram of a multi-stage wastepaper pulping process.

Multi-stage pulping can be carried out in a single batch pulper sequentially as indicated above or using continuous pulpers or batch pulpers arranged in series, if so desired. Multi-stage pulping is indicated schematically in FIG. 20. In a first stage 100 pulping is carried out at high consistency, in the range of 10-30% solids with flow control, as indicated herein, to avoid over-pulping. In a second stage 200 pulping is continued at a mid-consistency range of 6-8% solids or at low consistency (<6%) where permanent brightness loss due to over-pulping does not typically occur.

A still further exemplary method involves re-charging the high consistency pulper without removing the trash which can shorten cycle time by 50% or more. The velocity sensor allows one to skip the trash removal step for 2 or more cycles. The pulper as in the first or second method, pulping is performed to the desired endpoint, the topping water is added and the pulp pumped out through the extraction plate. The pulper is then recharged with more wastepaper and water and the velocity sensor makes it possible to adjust the charge to the correct viscosity. The charge is pulped to the predetermined energy input, topping water is added and the recharge is then pumped out of the pulper. Depending on the trash level, one might then either remove the trash or if low enough the process may be repeated with a second recharge and another another pulping cycle performed without detrashing the pulper. This exemplary method can be summarized as:
1. The pulper is charged with water (based on the actual weight of the wastepaper and the target consistency)

and then the wastepaper added while the rotor is turning at a moderate speed.
2. Once the wastepaper and initial water charge are entirely in the pulper the rotor is ramped to maximum speed limited only by the maximum power draw of the drive motor. The rotor speed is moderated during the pulper cycle if necessary to maintain motor power draw less than 100% of the maximum. Depending on the system design and loading, the power may begin to drop at some point as the speed is ramped up. It is preferable to utilize a smart controller algorithm to adjust the maximum speed if there is a drop in power indicative of poor circulation.
3. An accumulator for specific energy applied is started at the beginning of the pulping. The accumulator uses the actual pulp weight and the measured kW output of the motor to calculate specific energy.
4. The linear velocity at several points in the pulp mass is monitored and additional aliquots of dilution water are added to the pulper to maintain linear velocity above about 0.03 m/sec (0.1 ft/sec) at all points in the rising pulp mass.
5. Once the target specific energy is reached the "topping" dilution water is added and the rotor speed reduced to minimize the energy application to the pulp and prevent over pulping and the potential brightness loss.
6. The pulp is extracted from the pulper tub.
7. Steps 1 through 6 are repeated until flow readings indicate trash levels are excessive; whereupon the trash is removed (unpulped wastepaper and nonfiber contaminants too large to get through the extraction plate) and the system prepared to start the next cycle.

Still other processing protocols may be employed depending on the feed, product quality requirements and so forth.

In addition to improvements in brightness and dirt removal, the present invention also enables higher yields on wastepaper re-pulping as was found in connection with pulping trials by measuring electrical power delta to a motor powering a rotating trommel screen during trash removal cycles of a high consistency batch pulper. The power delta correlates with trash including the number of rejects (unpulped wastepaper) present on the trommel screen. It was found that re-pulping wastepaper utilizing the teachings of the present invention used 31% less applied energy to the rotating trommel screen as compared with conventional recipe based re-pulping of wastepaper. The power reduction to the trommel screen seen with the invention indicates a decrease in trash which correlates generally to a corresponding reduction in rejects. This represents a dramatic and unexpected improvement in yield from the wastepaper.

Embodiments of the Invention

Various exemplary embodiments and features of the invention are enumerated below.

There is thus provided in accordance with the present invention Embodiment No. 1 which is a method of pulping wastepaper comprising:
(a) providing a pulping vessel with a rotor having a power drive and at least one flow sensor adapted to measure slurry flow within the pulping vessel;
(b) charging the pulping vessel with wastepaper and water to form a slurry, the amounts of wastepaper and water being present such that the slurry has consistency in the range of from 10% to 30%;
(c) pulping the wastepaper charge in the pulping vessel while monitoring poloidal slurry flow in the pulping vessel; and
(d) from time-to-time, adding water to the pulping vessel when the poloidal flow in the pulping vessel falls below a predetermined lower threshold flow value in order to reduce viscosity and thereby restore poloidal flow within the pulping vessel.

Embodiment No. 2 is the method according to Embodiment No. 1, wherein the pulping vessel is provided with an ultrasonic Doppler flow sensor.

Embodiment No. 3 is the method according to Embodiment No. 2, wherein the pulping vessel is provided with a plurality of ultrasonic Doppler flow sensors.

Embodiment No. 4 is the method according to Embodiment No. 3, wherein the pulping vessel has a fill height, H, above a bottom of the pulping vessel and a first ultrasonic Doppler flow sensor disposed at a height of from 10-20% of height, H, a second ultrasonic Doppler flow sensor disposed at a height of from 40-60% of height, H, as well as a third ultrasonic Doppler flow sensor disposed at a height of from 70-90% of height, H.

Embodiment No. 5 is the method according to any one of the foregoing Embodiments, wherein the lower threshold flow value is 0.05 ft/sec or above.

Embodiment No. 6 is the method according to Embodiment No. 5, wherein the lower threshold flow value is 0.1 ft/sec or above.

Embodiment No. 7 is the method according to any one of Embodiment Nos. 1-6, wherein the lower threshold flow value is from 0.05 ft/sec to 0.5 ft/sec.

Embodiment No. 8 is the method according to any one of Embodiment Nos. 1-7, wherein the slurry is pulped at a consistency of from 12% to 25%.

Embodiment No. 9 is the method according to any one of Embodiment Nos. 1-8, wherein the power drive is a variable power drive operated at a pre-selected power level.

Embodiment No. 10 is the method according to Embodiment No. 9, wherein the variable power drive is a variable frequency power drive comprising an AC drive and an AC motor.

Embodiment No. 11 is the method according to Embodiment No. 10, wherein the AC motor is operated at a power level above 80% of the AC motor's maximum power rating.

Embodiment No. 12 is the method according to Embodiment No. 11, wherein the AC motor is operated at a power level above 90% of the AC motor's maximum power rating.

Embodiment No. 13 is the method according to Embodiment No. 12, wherein the AC motor is operated at a power level of up to 120% of the AC motor's maximum power rating.

Embodiment No. 14 is the method according to any one of Embodiment Nos. 1-13, wherein the slurry is pulped at a specific energy input of from 5 KwHr/MT to 40 KwHr/MT.

Embodiment No. 15 is the method according to Embodiment No. 14, wherein the slurry is pulped at a specific energy input of from 5 KwHr/MT to 30 KwHr/MT.

Embodiment No. 16 is the method according to Embodiment No. 14, wherein the slurry is pulped at a specific energy input of from 5 KwHr/MT to 25 KwHr/MT.

Embodiment No. 17 is the method according to Embodiment No. 14, wherein the slurry is pulped at a specific energy input of from 7.5 KwHr/MT to 20 KwHr/MT.

Embodiment No. 18 is the method according to Embodiment No. 14, wherein the slurry is pulped at a specific energy input of from 8 KwHr/MT to 15 KwHr/MT.

Embodiment No. 19 is the method according to any one of Embodiment Nos. 1-18, operated in a batch mode.

Embodiment No. 20 is the method according to Embodiment No. 19, wherein the slurry is pulped from 5 minutes to 20 minutes.

Embodiment No. 21 is the method according to Embodiment No. 19, wherein the slurry is pulped from 7.5 minutes to 15 minutes.

Embodiment No. 22 is the method according to any one of Embodiment Nos. 19-21, further comprising recovering the pulped wastepaper and repeating the method of pulping wastepaper without removing residual trash from the pulping vessel.

Embodiment No. 23 is the method according to any one of Embodiment Nos. 1-22, further comprising diluting the charge to the pulper with water to a consistency lower than 10% and pulping the diluted charge.

Embodiment No. 24 is the method according to Embodiment No. 23, wherein the charge to the pulper is diluted to a consistency in the range of from 6-8%.

Embodiment No. 25 is a method of making absorbent sheet comprising:
 (a) obtaining papermaking fiber from wastepaper by way of pulping wastepaper according to the method of any one of Embodiment Nos. 1 to 22;
 (b) recovering papermaking fiber from the pulping vessel, optionally further processing the recovered fiber by de-inking and/or bleaching the recovered fiber; and
 (c) incorporating the recovered papermaking fiber into an absorbent sheet.

Embodiment No. 26 is the method of making absorbent sheet according Embodiment No. 25, wherein the sheet is a paper towel sheet.

Embodiment No. 27 is the method of making absorbent sheet according to Embodiment No. 25, wherein the sheet is a paper tissue sheet.

Embodiment No. 28 is the method of making absorbent sheet according to any one of Embodiment Nos. 25-27, wherein the recovered papermaking fiber is incorporated into the absorbent sheet by way of a CWP Process.

Embodiment No. 29 is the method of making absorbent sheet according to any one of Embodiment Nos. 25-27, wherein the recovered papermaking fiber is incorporated into the absorbent sheet by way of a Structured Basesheet Process.

Embodiment No. 30 is the method of making absorbent sheet according to any one of Embodiment Nos. 25-27, wherein the recovered papermaking fiber is incorporated into the absorbent sheet by way of a TAD Process.

Embodiment No. 31 is the method of making absorbent sheet according to any one of Embodiment Nos. 25-30, wherein the absorbent sheet comprises at least 30% by weight of recovered papermaking fiber.

Embodiment No. 32 is the method of making absorbent sheet according to Embodiment No. 31, wherein the absorbent sheet comprises at least 50% by weight of recovered papermaking fiber.

Embodiment No. 33 is the method of making absorbent sheet according to Embodiment No. 31 or 32, wherein the absorbent sheet comprises from 30% to 80% by weight recovered papermaking fiber.

Embodiment No. 34 is a high consistency pulping apparatus comprising:
 (a) a pulping tub for receiving a wastepaper slurry;
 (b) a rotor disposed in the pulping tub, coupled to a power drive; and
 (c) at least one flow sensor attached to the pulping tub adapted to measure slurry flow within the pulping vessel.

Embodiment No. 35 is the apparatus according to Embodiment No. 34, wherein the flow sensor is an ultrasonic Doppler flow sensor.

Embodiment No. 36 is the apparatus according to Embodiment No. 34 or 35, wherein the pulping tub is provided with a plurality of ultrasonic Doppler flow sensors.

Embodiment No. 37 is the apparatus according to Embodiment No. 36, wherein the pulping tub has a fill height, H, above a bottom of the pulping tube and a first ultrasonic Doppler flow sensor disposed at a height of from 10-20% of height, H, a second ultrasonic Doppler flow sensor disposed at a height of from 40-60% of height, H, as well as a third ultrasonic Doppler flow sensor disposed at a height of from 70-90% of height, H.

Embodiment No. 38 is the apparatus according to any one of Embodiment Nos. 34-37, wherein the pulping tub has disposed therein one or more baffle plates between the rotor and a sidewall of the pulping tub.

Embodiment No. 39 is the apparatus according to any one of Embodiment Nos. 34-38, wherein the power drive is a variable power drive.

Embodiment No. 40 is the apparatus according to Embodiment No. 39, wherein the variable power drive is a variable frequency power drive comprising an AC drive and an AC motor.

Embodiment No. 41 is a method of pulping wastepaper comprising:
 (a) providing a pulping vessel with a rotor having a power drive and at least one flow sensor adapted to measure slurry flow within the pulping vessel;
 (b) charging the pulping vessel with wastepaper and water to form a slurry, the amounts of wastepaper and water being present such that the slurry has consistency in the range of from 10% to 30%;
 (c) selecting target levels for (i) poloidal slurry flow in the pulping vessel; (ii) power input to the power drive; and (iii) rotor RPM;
 (d) pulping the wastepaper charge in the pulping vessel while monitoring (i) poloidal slurry flow in the pulping vessel; (ii) power input to the power drive; and (iii) rotor RPM; and
 (e) adding water to the pulping vessel during pulping of the wastepaper charge to adjust measured levels of one or more of (i) poloidal slurry flow, (ii) power input to the power drive, and (iii) rotor RPM toward the corresponding target value.

Embodiment No. 42 is the method according to Embodiment No. 41, wherein the target level for poloidal slurry flow is in the range of from about 0.1 ft/sec to about 0.4 ft/sec.

Embodiment No. 43 is the method according to Embodiment No. 42, wherein the target level for poloidal slurry flow is from about 0.15 ft/sec to about 0.25 ft/sec.

Embodiment No. 44 is the method according to any one of Embodiment Nos. 41-43, wherein target level for power input to the power drive is in the range of from about 700 kw to about 1500 kw.

Embodiment No. 45 is the method according to Embodiment No. 44, wherein target level for power input to the power drive is in the range of from about 800 kw to about 1200 kw.

Embodiment No. 46 is the method according to any one of Embodiment Nos. 41-45, wherein the target level for rotor RPM is in the range of from about 60 to about 180.

Embodiment No. 47 is the method according to Embodiment No. 46, wherein the target level for rotor RPM is in the range of from about 75 to about 140.

Embodiment No. 48 is a method of pulping wastepaper comprising:
 (a) providing a pulping vessel with a rotor having a power drive and at least one flow sensor adapted to measure slurry flow within the pulping vessel;
 (b) charging the pulping vessel with wastepaper and water to form a slurry, the amounts of wastepaper and water being present such that the slurry has consistency in the range of from 10% to 30%;
 (c) selecting target levels for the ratio of (i) power input to the power drive/rotor RPM and (ii) poloidal slurry flow in the pulping vessel;
 (d) pulping the wastepaper charge in the pulping vessel while monitoring (i) the ratio of power input to the power drive/rotor RPM and (ii) poloidal slurry flow in the pulping vessel; and
 (e) adding water to the pulping vessel during pulping of the wastepaper charge to adjust measured levels of one or more of (i) the ratio of power input to the power drive/rotor RPM and (ii) poloidal slurry flow toward the corresponding target values.

Embodiment No. 49 is the method according to Embodiment No. 48, wherein the target level of ratio of power input to the power drive/rotor RMP is in the range of from 6 kw/RPM to 10 kw/RPM.

Embodiment No. 50 is the method according to Embodiment No. 49, wherein the target level of ratio of power input to the power drive/rotor RMP is in the range of from 7 kw/RPM to 9 kw/RPM.

Embodiment No. 51 is the method according to any one of Embodiment Nos. 48-50, wherein the target level for poloidal slurry flow is in the range of from about 0.1 ft/sec to about 0.4 ft/sec.

Embodiment No. 52 is the method according to Embodiment No. 51, wherein the target level for poloidal slurry flow is in the range of from about 0.15 ft/sec to about 0.25 ft/sec.

Embodiment No. 53 is a method of pulping wastepaper comprising:
 (a) providing a pulping vessel with a rotor having a power drive and at least one flow sensor adapted to measure slurry flow within the pulping vessel;
 (b) charging the pulping vessel with wastepaper and water to form a slurry, the amounts of wastepaper and water being present such that the slurry has consistency in the range of from 10% to 30%;
 (c) selecting a target level for poloidal slurry flow within the pulping vessel;
 (d) pulping the wastepaper charge in the pulping vessel while monitoring poloidal slurry flow in the pulping vessel; and
 (e) adding water to the pulping vessel to adjust measured levels of poloidal slurry flow toward the target value.

Embodiment No. 54 is the method according to Embodiment No. 53, wherein the target level for poloidal slurry flow is in the range of from about 0.1 ft/sec to about 0.4 ft/sec.

Embodiment No. 55 is the method according to Embodiment No. 54, wherein the target level for poloidal slurry flow is in the range of from about 0.15 ft/sec to about 0.25 ft/sec.

Embodiment No. 56 is a method of pulping wastepaper comprising:
 (a) providing a pulping vessel with a rotor having a power drive and at least one flow sensor adapted to measure slurry flow within the pulping vessel;
 (b) charging the pulping vessel with wastepaper and water to form a slurry, the amounts of wastepaper and water being present such that the slurry has consistency in the range of from 10% to 30%;
 (c) pulping the wastepaper charge in the pulping vessel while monitoring poloidal slurry flow in the pulping vessel;
 (d) discontinuing pulping of the wastepaper charge after the onset of instability of poloidal slurry flow.

Embodiment No. 57 is the method according to Embodiment No. 56, wherein pulping is discontinued within 5 minutes after the onset of instability of poloidal slurry flow.

Embodiment No. 58 is the method according to Embodiment No. 57, wherein pulping is discontinued within 2 minutes after the onset of instability of poloidal slurry flow.

Embodiment No. 59 is the method according to Embodiment No. 58, wherein pulping is discontinued within 1 minute after the onset of instability of poloidal slurry flow.

Embodiment No. 60 is a method of pulping wastepaper comprising:
 (a) providing a pulping vessel with a rotor having a power drive and at least one flow sensor adapted to measure slurry flow within the pulping vessel;
 (b) charging the pulping vessel with wastepaper and water to form a slurry, the amounts of wastepaper and water being present such that the slurry has consistency in the range of from 10% to 30%;
 (c) pulping the wastepaper charge in the pulping vessel while monitoring poloidal slurry flow in the pulping vessel;
 (e) operating the pulping vessel including optionally adding additional water to the pulping vessel in order to maintain poloidal slurry flow within the range of from about 0.1 ft/sec to about 0.4 ft/sec during pulping.

Embodiment No. 61 is the method according to Embodiment No. 60, wherein poloidal slurry flow is maintained within the range of from about 0.15 ft/sec to about 0.25 ft/sec during pulping.

The following levels and features may be used in connection with any pulping procedure of the present invention as target levels or operating levels maintained during pulping.

Consistency of the wastepaper charge is in the range of from about 10% to 30% consistency, suitably from 12% to 25% consistency.

Energy input to the wastepaper charge during pulping is in the range of from about 5 kwh/MT to about 40 kwh/MT, suitably from 5 kwh/MT to 30 kwh/MT or from 5 kwh/MT to 25 kwh/MT or from 7.5 kwh/MT to 20 kwh/MT. MT refers to metric tons of dry wastepaper provided to the charge to the pulper; kwh to kilowatt hours of energy input provided to the pulper during pulping of the wastepaper charge.

The lower threshold slurry flow value is in the range of 0.05 ft/sec to 0.5 ft/sec, typically 0.05 ft/sec or 0.1 ft/sec.

Poloidal slurry flow is typically in the range of from 0.1 ft/sec to 0.4 ft/sec during pulping; preferably in the range of from 0.15 ft/sec to 0.25 ft/sec during pulping.

Power input to the rotor power drive is generally in the range of from 700 to 1500 kw; preferably in the range of from 800 kw to 1200 kw.

Rotor speed revolutions per minute (RPM) is in the range of from 60 RPM to 180 RPM; typically within the range of from 75 RPM to 140 RPM.

The ratio of power input to the rotor RPM is in the range of from 6 kw/RPM to 10 kw/RPM; suitably from 7 kw/RPM to 9 kw/RPM.

Pulping duration is generally from 5 minutes to 20 minutes; more typically from 7.5 minutes to 15 minutes.

Pulping may be terminated after the onset of instability in poloidal slurry flow rather than after a target time interval. When the onset of instability is used as a marker for discontinuing pulping of a wastepaper, pulping may be terminated within 5 minutes after the onset of instability if poloidal slurry flow, within 2 minutes after the onset of instability of poloidal slurry flow or at shorter or longer times after the onset of instability of poloidal slurry flow, depending on conditions.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the foregoing description including the Detailed Description and Background of the Invention, the disclosures of which are all incorporated herein by reference, further description is deemed unnecessary. In addition, it should be understood from the foregoing discussion that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A method of pulping wastepaper comprising:
   (a) providing a pulping vessel with a rotor having a power drive and at least one flow sensor adapted to measure slurry flow within the pulping vessel;
   (b) charging the pulping vessel with wastepaper and water to form a wastepaper slurry, the amounts of wastepaper and water being present such that the slurry has consistency in the range of from 10% to 30%;
   (c) pulping the wastepaper slurry in the pulping vessel while monitoring poloidal slurry flow in the pulping vessel; and
   (d) maintaining poloidal slurry flow in the pulper within a range of from 0.05 ft/sec to 0.6 ft/sec during pulping, wherein the poloidal slurry flow is maintained at or above a lower threshold slurry flow value of 0.05 ft/sec for at least 60% of pulping duration.

2. The method according to claim 1, wherein the pulping vessel is provided with an ultrasonic Doppler flow sensor.

3. The method according to claim 1, wherein the poloidal slurry flow is maintained at or above the lower threshold slurry flow value for at least 75% of pulping duration.

4. The method according to claim 3, wherein poloidal slurry flow is maintained at or above the lower threshold slurry flow value for at least 75% of pulping duration by (i) adding additional water, (ii) adjusting power input to the wastepaper slurry, (iii) adjusting rotor speed, or a combination of one or more of (i), (ii) and (iii).

5. The method according to claim 1, wherein the lower threshold slurry flow value is 0.1 ft/sec.

6. The method according to claim 5, wherein the target level of energy input to the wastepaper charge is within the range of from 5 kwh/MT to 20 kwh/MT.

7. The method according to claim 1, further comprising selecting a target level of energy input to the wastepaper charge and continuing pulping of the wastepaper charge until the target level of energy input to the wastepaper charge is achieved.

8. The method according to claim 1, wherein the poloidal slurry flow in the pulper is maintained within the range of from about 0.1 ft/sec to about 0.4 ft/sec during pulping.

9. The method according to claim 8, wherein the poloidal slurry flow in the pulper is maintained within the range of from about 0.15 ft/sec to about 0.25 ft/sec during pulping.

10. The method according to claim 1, wherein power input to the power drive is maintained within the range of from about 700 kw to about 1500 kw during pulping.

11. The method according to claim 1, wherein the rotor RPM is maintained within the range of from about 60 to about 180 during pulping.

12. The method according to claim 11, wherein the rotor RPM is maintained within the range of from about of from about 75 to about 140 during pulping.

13. The method according to claim 1, wherein the ratio of power input to the power drive to rotor RPM is maintained within the range of from about 6 kw/RPM to about 10 kw/RPM during pulping.

14. The method according to claim 1, wherein the method includes pulping the wastepaper charge in the pulping vessel while monitoring (i) poloidal slurry flow in the pulping vessel; (ii) power input to the power drive; and (iii) rotor RPM; and adding additional water to the pulping vessel during pulping of the wastepaper charge to adjust measured levels of one or more of (i) poloidal slurry flow, (ii) power input to the power drive, and (iii) rotor RPM toward a corresponding target level.

15. The method according to claim 1, wherein the method includes pulping the wastepaper charge in the pulping vessel while monitoring (i) the ratio of power input to the power drive/rotor RPM and (ii) poloidal slurry flow in the pulping vessel; and adding additional water to the pulping vessel during pulping of the wastepaper charge to adjust measured levels of one or more of (i) the ratio of power input to the power drive/rotor RPM and (ii) poloidal slurry flow toward a corresponding target level.

16. The method according to claim 1, wherein the method includes pulping the wastepaper charge in the pulping vessel while monitoring poloidal slurry flow in the pulping vessel; and discontinuing pulping of the wastepaper charge after an onset of instability in poloidal slurry flow.

17. The method according to claim 16, wherein pulping is discontinued within 2 minutes after the onset of instability of poloidal slurry flow.

18. The method according to claim 1, wherein the method includes pulping the wastepaper charge in the pulping vessel while monitoring poloidal slurry flow in the pulping vessel; and adding additional water to the pulping vessel to adjust measured levels of poloidal slurry flow toward a target level.

19. The method according to claim 1, wherein the method includes pulping the wastepaper charge in the pulping vessel while monitoring poloidal slurry flow in the pulping vessel; and operating the pulping vessel including adding additional water to the pulping vessel while maintaining poloidal slurry flow within the range of from about 0.1 ft/sec to about 0.4 ft/sec.

20. A method of making absorbent sheet comprising:
   (a) obtaining papermaking fiber from wastepaper by way of pulping wastepaper according to the method of claim 1;
   (b) recovering papermaking fiber from the pulping vessel, optionally further processing the recovered fiber by de-inking and/or bleaching the recovered fiber; and (c) incorporating the recovered papermaking fiber into an absorbent sheet.

* * * * *